US006740803B2

(12) United States Patent
Brinkman et al.

(10) Patent No.: US 6,740,803 B2
(45) Date of Patent: May 25, 2004

(54) COMPUTING DEVICE TO ALLOW FOR THE SELECTION AND DISPLAY OF A MULTIMEDIA PRESENTATION OF AN AUDIO FILE AND TO ALLOW A USER TO PLAY A MUSICAL INSTRUMENT IN CONJUNCTION WITH THE MULTIMEDIA PRESENTATION

(75) Inventors: John Brinkman, Simi Valley, CA (US); Dave Hamilton, Newbury Park, CA (US); John Longawa, Thousand Oaks, CA (US); Rob Rampley, Woodland Hills, CA (US); Charles Corris Randall, Winnetka, CA (US); Marcus Ryle, Westlake Village, CA (US)

(73) Assignee: Line 6, INC, Agoura Hills, CA (US)

( * ) Notice: Subject to any disclaimer, the term of this patent is extended or adjusted under 35 U.S.C. 154(b) by 212 days.

(21) Appl. No.: 09/990,803

(22) Filed: Nov. 21, 2001

(65) Prior Publication Data

US 2003/0094092 A1 May 22, 2003

(51) Int. Cl.$^7$ ............................. A61H 5/00; G04B 13/00
(52) U.S. Cl. ............................................. 84/609; 84/626
(58) Field of Search ........................... 84/600, 609, 626

(56) References Cited

U.S. PATENT DOCUMENTS

| 5,583,308 | A | | 12/1996 | Owen | |
|---|---|---|---|---|---|
| 5,690,496 | A | | 11/1997 | Kennedy | |
| 5,789,689 | A | | 8/1998 | Doidic et al. | |
| 5,864,868 | A | * | 1/1999 | Contois | 707/104.1 |
| 5,905,736 | A | | 5/1999 | Ronen et al. | |
| 5,993,220 | A | * | 11/1999 | Nakamura et al. | 434/307 A |
| 6,211,451 | B1 | * | 4/2001 | Tohgi et al. | 84/70 R |
| 6,226,672 | B1 | * | 5/2001 | DeMartin et al. | 709/219 |
| 6,353,174 | B1 | * | 3/2002 | Schmidt et al. | 84/609 |
| 6,423,893 | B1 | * | 7/2002 | Sung et al. | 84/645 |
| 6,426,455 | B2 | | 7/2002 | Hasegawa | |
| 6,541,692 | B2 | * | 4/2003 | Miller | 84/634 |
| 6,552,254 | B2 | * | 4/2003 | Hasegawa et al. | 84/609 |
| 2002/0026865 | A1 | | 3/2002 | Akahori | |
| 2002/0144588 | A1 | * | 10/2002 | Naples et al. | 84/609 |

OTHER PUBLICATIONS

Tom Sheldon, Encyclopedia of Networking, Electronic Edition, pp. 324–329, Osborne/McGraw–Hill, 1998.
Line 6, Amp Farm, The Guitar Recording Plug–In for TDM–Equipped Pro Tools Systems, http://www.sigidesign.com/products/prd_overview.cfm?product_id =1001 & http://a396.g.akamai.net/7/396/1848/7473dc3aa964dc/media.digidesign.com/products/images, 2001.
Line 6, Amp Far, The Guitar Recording Plug–In for TDM–Equipped Pro Tools Systems, http://www.digidesign.com/products/prd_specs.cfm?product_id =1001,2001.
e–commerce—a searchEBusiness definition, E–tailing or The Virtual Storefront and the Virtual Mall, http://searchebusiness.techtarget.com/sDefinition/0,,sid19$_{13}$gci212029,,00.html, 2001.

* cited by examiner

Primary Examiner—Jeffrey Donels
(74) Attorney, Agent, or Firm—Blakely, Sokoloff, Taylor & Zafman LLP

(57) ABSTRACT

Disclosed is a computing device to allow for the selection and display of a multimedia presentation of an audio file to a user. An interface device couples the musical instrument to the computing device by performing A/D conversion of the musical instrument's analog audio signal to create a digitized audio signal. The computing device includes a communication device and a processor. The communication device transmits a user's request for the selection of a musical piece to a server. In turn, the communication device receives a session file associated with the musical piece from the server. The processor processes the session file such that the computing device presents a multimedia presentation of the audio file to the user. Moreover, the processor processes the digitized audio signal of the musical instrument so that the user can play the musical instrument in conjunction with the multimedia presentation of the audio file.

33 Claims, 30 Drawing Sheets

Top View

Front View

Back View

COMPUTING DEVICE TO ALLOW FOR THE SELECTION AND DISPLAY OF A MULTIMEDIA PRESENTATION OF AN AUDIO FILE AND TO ALLOW A USER TO PLAY A MUSICAL INSTRUMENT IN CONJUNCTION WITH THE MULTIMEDIA PRESENTATION

BACKGROUND

1. Field of the Invention

This invention relates to a computing device. In particular, the invention relates to a computing device to allow for the selection and display of a multimedia presentation of an audio file and to allow a user to play a musical instrument in conjunction with the multimedia presentation.

2. Description of Related Art

Many software packages that utilize digital signal processing (DSP) algorithms have been developed to allow computer users to use their computer to create and edit music. Further, the development of the MIDI (Musical Instrument Digital Interface) standard protocol has allowed for the interchange of musical information between musical instruments, synthesizers and computers. The MIDI protocol defines the codes for a musical event, which includes the start of a note, its pitch, lead, volume and musical attributes such as vibrato. A computer with a MIDI interface can be used to record a musical session, but instead of recording the analog sound wave as in a tape recorder, the computer stores the music as keystroke and control codes. The recording can then be edited utilizing a software package in an entirely different manner than the conventional recording; for example, the rhythm can be changed by editing the time codes in the MIDI messages. As another example, the computer can easily transpose a performance from one key to another. The multitude of ways that a MIDI recording can be edited is virtually limitless.

Moreover, specific software programs have been developed, with and without the use of MIDI, to allow users to use their computer to make music by inputting a musical instrument (e.g. a keyboard or guitar) into their computer. Generally, the analog audio signal from the musical instrument undergoes analog to digital (A/D) conversion (e.g. performed by a sound card in the computer) and the digital version of the audio signal can then undergo digital signal processing by the computer such that it can be altered by a computer program. This alteration can occur under the control of the user (e.g. for music editing) or in pre-defined ways by the software program. The digitally altered signal can then be converted back to analog form (e.g. digital to analog (D/A) conversion) for playback to the user. For example, a user playing a guitar hooked into his or her computer could choose that the guitar audio signal be digitally altered such that it is played back in a distorted manner.

Unfortunately, with all the advances in digital signal processing to allow user's to use their computers to make and edit music, computers have still not been fully utilized in a manner that facilitates users learning how to play music effectively. Moreover, users do not currently have quick and easy access to a wide array of musical choices from which to learn.

SUMMARY OF THE INVENTION

The present invention relates to a computing device to allow for the selection and display of a multimedia presentation of an audio file and to allow a user to play a musical instrument in conjunction with the multimedia presentation.

By way of explanation, an interface device couples the musical instrument to the computing device by performing analog to digital conversion of the musical instrument's analog audio signal to create a digitized audio signal. Also, a server transmits a session file associated with a musical piece to the computing device through a computer network. The session file includes an audio file and multimedia data.

The computing device includes a communication device and a processor. The communication device transmits a user's request for the selection of a musical piece to the server. In turn, the communication device receives a session file associated with the musical piece from the server. The processor processes the session file such that the computing device presents a multimedia presentation of the audio file to the user. Moreover, the processor processes the digitized audio signal of the musical instrument so that the user can play the musical instrument in conjunction with the multimedia presentation of the audio file. Accordingly, a user can be provided with quick and easy access to a wide variety of multimedia presentations of audio files, and the user can then play along with the audio file, which is presented in a multimedia presentation format to facilitate learning.

BRIEF DESCRIPTION OF THE DRAWINGS

The features and advantages of the present invention will become apparent from the following description of the present invention in which:

FIG. 2b illustrates a typical architecture of the conventional data processing or computer system shown in FIG. 2a.

DETAILED DESCRIPTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
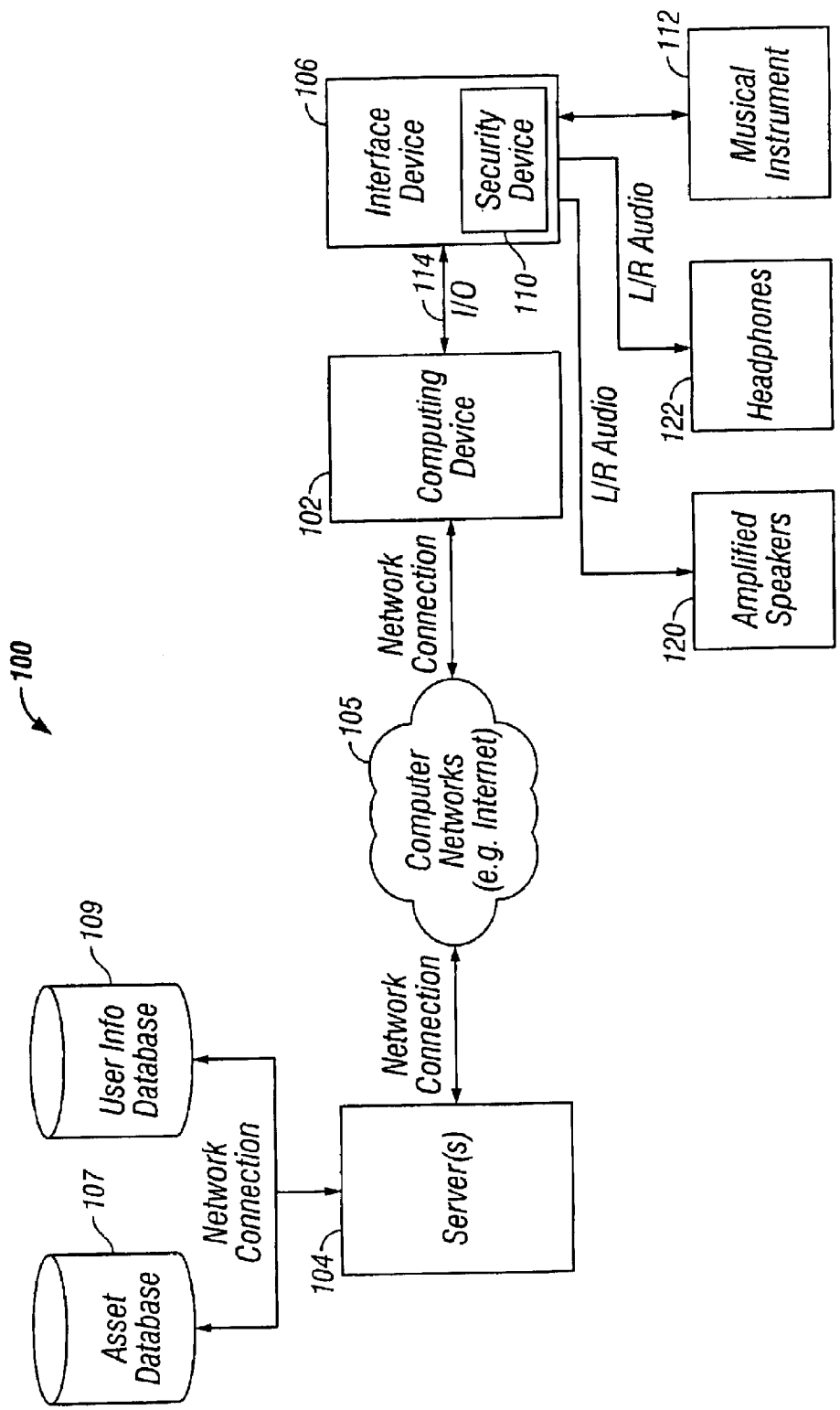
FIG. 1 is a block diagram illustrating an exemplary system to deliver a multimedia presentation of an audio file to a computing device, according to one embodiment of the present invention.

Referring now to FIG. 1, FIG. 1 shows a block diagram illustrating an exemplary system 100 to deliver a multimedia presentation of an audio file to a computing device 102, according to one embodiment of the present invention. One or more servers 104 are coupled to computing device 102 through a computer network (e.g. the Internet) 105. In one embodiment, in response to a user selecting a musical piece at a computing device 102, server 104 transmits a session file associated with the musical piece to the computing device 102 through the computer network (e.g. the Internet) 105. The session file includes a digital audio file and multimedia data. The computing device 102 processes the session file to present the multimedia presentation of the audio file to the user, as will be discussed. The server or server(s) 104 are also coupled through network connections to an asset database 107 that stores session files, and other assets, and a user information database 109 that stores information related to users, as will be discussed.

An interface device 106, including a security device 110, is connected to the computing device 102 and the user's musical instrument 112 (e.g. a guitar). The interface device 106 couples the musical instrument 112 to the computing device 102 over an input/output (I/O) link 114 (e.g. a Universal Serial Bus link) such that the user can play the musical instrument 112 in conjunction with a multimedia presentation of the digital audio file being processed by the computing device 102. Furthermore, the interface device 106 can be connected an analog sound device, such as amplified speakers 120 or headphones 122, to play the audio file associated with selected musical piece along with sound from the user's musical instrument 112, as the user plays along with his or her musical instrument.

More specifically, the interface device 106 performs analog to digital (A/D) conversion of the audio signal from the musical instrument 112 and transmits the digitized audio signal of the musical instrument 112 via I/O link 114 to the computing device 102 where the digitized audio signal of the musical instrument 112 may undergo digital signal processing (DSP) performed by a software module to create a processed digital audio signal of the musical instrument, for example, to tailor it to the audio file of the musical piece that was selected by the user. The computing device 102 creates a mixed digital signal of both the digital audio file and the processed digital signal of the musical instrument, which is transmitted back from the computing device 102 along I/O link 114 to the interface device 106, where the mixed digital signal is converted to analog form (D/A conversion) into a mixed analog audio signal that is outputted through an analog sound device, such as speakers 120 or headphones 122. Thus, a user can play along with the downloaded musical piece, which is presented in a multimedia presentation format on the computing device, to facilitate learning by the user. Moreover, as will be discussed, the user is provided with quick and easy access to a wide variety of musical pieces that they can download from the server 104.

It should be appreciated by those having skill in the network-related arts that computing device 102 and the server(s) 104 may be coupled to the computer network 105 in a variety of ways including through direct or dial-up telephone or other network transmission lines, using a modem pool (not illustrated), or through an additional network and gateway (not illustrated). For example, the computing device 102 can communicate with a server 104 via a link utilizing one or more of the plain old telephone system (POTS), a cellular phone system, cable, Digital Subscriber Line, Integrated Services Digital Network, satellite connection, computer network (e.g. the Internet, a wide area network (WAN), or a local area network (LAN), etc.), or generally any sort of private or public telecommunication system, and combinations thereof. Examples of a transport medium for the links include, but are not limited or restricted to electrical wire, optical fiber, cable including twisted pair, or wireless channels (e.g. radio frequency (RF), terrestrial, satellite, or any other wireless signaling methodology).

More particularly, the computer network 105 is typically a computer network (e.g. the Internet, a wide area network (WAN), or a local area network (LAN), etc.), which is a packetized, packet-switched, connection oriented, etc., network that can utilize Transmission Control Protocol/Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. The computer network 105 allows the communication of data traffic between the computing device 102 and the server(s) 104 using packets. Data traffic through the network computer 105 may be of any type including audio, text, graphics, video, e-mail, Fax, multimedia, documents, voice, and other generic forms of data. The computer network 105 is typically a data network that may contain switching or routing equipment designed to transfer digital data traffic. It should be appreciated that the FIG. 1 environment is only exemplary and that embodiments of the present invention can be used with any type of telecommunication system and/or computer network, protocols, and combinations thereof. Moreover, the network connections between the server(s) 104 and the asset database 107 and user information database 109 can also be coupled in ways exemplified by the previously described examples.

Figure 2A:
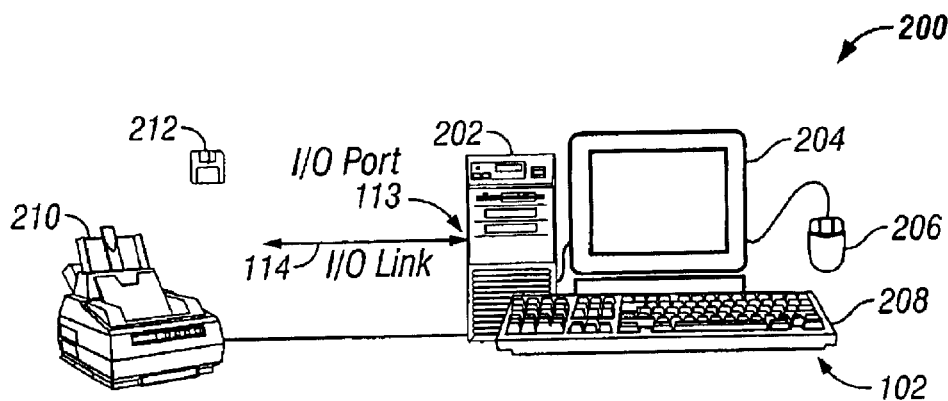
FIG. 2a illustrates a conventional data processing or computer system useable with embodiments of the present invention.

Having briefly described an exemplary network environment in which embodiments of the present invention can be practiced, FIG. 2a illustrates a conventional data processing or computer system 200 useable with embodiments of the present invention. More particularly, FIG. 2a illustrates an example of a general data processing or computing system 200 for use as an exemplary computing device 102 (e.g. personal computer) or server computer system 104, in which various aspects of the present invention may be utilized.

As illustrated, data processing or computer system 200 is comprised of a system unit 202, output devices such as display device 204 and printer 210, and input devices such as keyboard 208, and mouse 206. Data processing system 200 receives data for processing by the manipulation of input devices 208 and 206 or directly from fixed or removable media storage devices such as disk 212 and network connection interfaces (not illustrated). Data processing system 200 then processes data and presents resulting output data via output devices such as display device 204, printer 210, fixed or removable media storage devices like disk 212 or network connection interfaces. It should be appreciated that the computing device 102 can be any sort of computer system or computing device (e.g. personal computer (laptop/desktop), network computer, handheld computing device, server computer, or any other type of computer). Moreover, in the case of the computing device 102, the data processing system 200 includes a serial I/O port 113 (e.g. a USB port) to accommodate input and output data from the interface device 102 through I/O link 114 (e.g. a USB link).

Figure 2B:
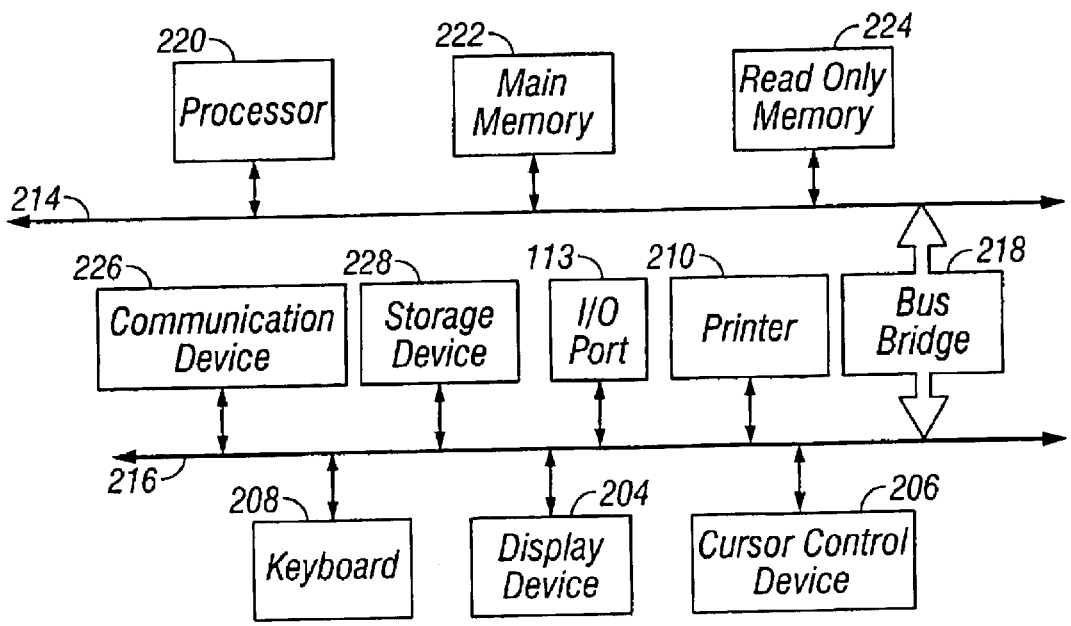

Referring now to FIG. 2b, there is depicted a high-level block diagram of the components of a data processing system 200 such as that illustrated by FIG. 2a. In a conventional computer system, system unit 202 includes a processing device such as processor 220 in communication with main memory 222 which may include various types of cache, random access memory (RAM), or other high-speed dynamic storage devices via a local or system bus 214 or other communication means for communicating data between such devices. The processor processes information in order to implement the functions of the embodiments of the present invention. As illustrative examples, the "processor" may include a central processing unit having any type of architecture such as complex instruction set computers (CISC), reduced instruction set computers (RISC), very long instruction word (VLIW), or hybrid architecture, or a digital signal processor, a microcontroller, a state machine, etc.

Main memory 222 is capable of storing data as well as instructions to be executed by processor 220 and may be used to store temporary variables or other intermediate information during execution of instructions by processor 220. Computer system 200 also comprises a read only memory (ROM) and/or other static storage devices 224 coupled to local bus 214 for storing static information and instructions for processor 220. Examples of non-volatile memory 224 include a hard disk, flash memory, battery-backed random access memory, Read-only-Memory (ROM) and the like whereas volatile main memory 222 includes random access memory (RAM), dynamic random access memory (DRAM) or static random access memory (SRAM), and the like.

System unit 202 of data processing system 200 also features an expansion bus 216 providing communication between various devices and devices attached to the system bus 214 via bus bridge 218. A data storage device 228, such as a magnetic disk 212 or optical disk such as a CD-ROM or DVD and its corresponding drive may be coupled to data processing system 200 for storing data and instructions via expansion bus 216. Computer system 200 can also be coupled via expansion bus 216 to a display device 204, such as a cathode ray tube (CRT) or a liquid crystal display (LCD), for displaying data to a computer user such as generated meeting package descriptions and associated images. Typically, an alphanumeric input device 208, including alphanumeric and other keys, is coupled to bus 216 for communicating information and/or command selections to processor 220. Another type of user input device is cursor control device 206, such as a conventional mouse, trackball, or cursor direction keys for communicating direction information and command selection to processor 220 and for controlling cursor movement on display 204. Moreover, in the case of the computing device 102, the data processing system 200 includes a serial I/O port 113 (e.g. a USB port) to accommodate input and output data from the interface device 106 through serial I/O link 114 (e.g. a USB link).

A communication device 226 is also coupled to bus 216 for accessing remote computers or servers, such as server 104, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 104 via a network infrastructure such as that illustrated in FIG. 1 and described above.

In continuing with the example of the conventional data processing or computer system 200, both the computing device 102 and server 104 may operate under the control of an operating system that is booted into the memory of the device for execution when the device is powered-on or reset. In turn, the operating system controls the execution of one or more software modules or computer programs. These software modules typically include application programs that aid the user in utilizing the computing device 102 and the server 104, and the various functions associated with delivering a multimedia presentation of an audio file to a computing device 102 for display to user, and to allow the user to play a musical instrument in conjunction with the multimedia presentation, as well as, other functions related to security and commerce methods, as will be discussed.

These functions can be implemented as one or more instructions (e.g. code segments), to perform the desired functions of the invention. When implemented in software (e.g. by a software module), the elements of the present invention are the instructions/code segments to perform the necessary tasks. The instructions which when read and executed by a machine or processor (e.g. processor 220), cause the machine or processor to perform the operations necessary to implement and/or use embodiments of the invention. The instructions or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

Figure 3A:
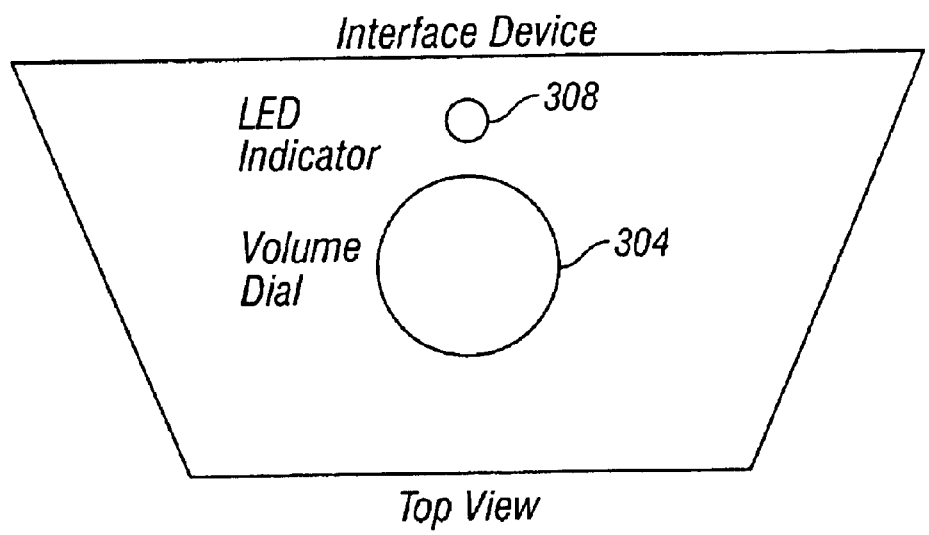
FIG. 3a illustrates a top view of an interface device, according to one embodiment of the present invention.
Figure 3B:
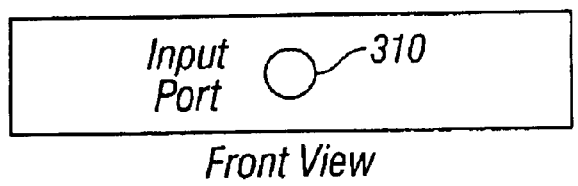
FIG. 3b illustrates a front view of the interface device, according to one embodiment of the present invention.

Turning now to FIG. 3a, FIG. 3a illustrates a top view of an interface device 106, according to one embodiment of the present invention. The interface device 106 couples the musical instrument 112 to the computing device 102 over the input/output (I/O) link 114 such that the user can play a musical instrument 112 in conjunction with a multimedia presentation of the audio file being processed by the computing device 102. As shown in the top view of FIG. 3a, the interface device 106 includes a volume dial or knob 304 to adjust the volume of the musical instrument 112 and the audio file and an LED indicator 308 to indicate interface device operating status (i.e. whether power is on or off). The interface device 106 can include a metal, plastic, or metallized plastic housing to contain the internal electronic components. Turning briefly to FIG. 3b, which illustrates a front view of the interface device 106, according to one embodiment of the invention, the interface device includes an input port 310 to receive an input jack (or other input device) from a musical instrument 112 such that the musical instrument is electrically coupled to the interface device 106.

Figure 3C:
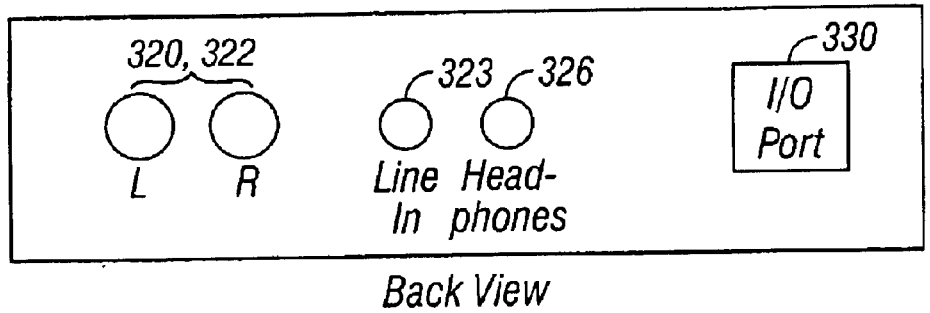
FIG. 3c illustrates a back view of the interface device, according to one embodiment of the present invention.

Referring now to FIG. 3c, FIG. 3c illustrates a back view of the interface device 106, according to one embodiment of the present invention. The interface device 106 includes left and right speaker output ports 320 and 322 that can be used to accept speaker jacks for amplified speakers 120 so that the interface device 106 can be connected to amplified speakers. This allows a user playing his or her musical instrument 112 to hear both the musical instrument as well as an audio file associated with the musical piece being processed by the computing device 102. Furthermore, the interface device 106 includes an additional line in port 323. For example, the additional line in port 323 can be used to support input from a sound card of the computing device 102 such that sounds from games and other software programs from the computing device 102 can simply be routed through the interface device 106 to the speakers 120 or headphones 122.

Also, interface device 106 includes a headphone output port 326 that can be used to accept a headphone jack for headphones 122 to allow the user to listen to his or her musical instrument 112, as well as the audio file, using headphones 122. The interface device 106 further includes a serial I/O port 330 (e.g. a USB port) to accept an I/O connector (e.g. a USB connector) such that the I/O link 114 (e.g. a USB link) can be formed between the interface device 106 and the computing device 102. It should be appreciated that the interface device 106 can also include any number of other input and outputs.

Figures 1, 3D:
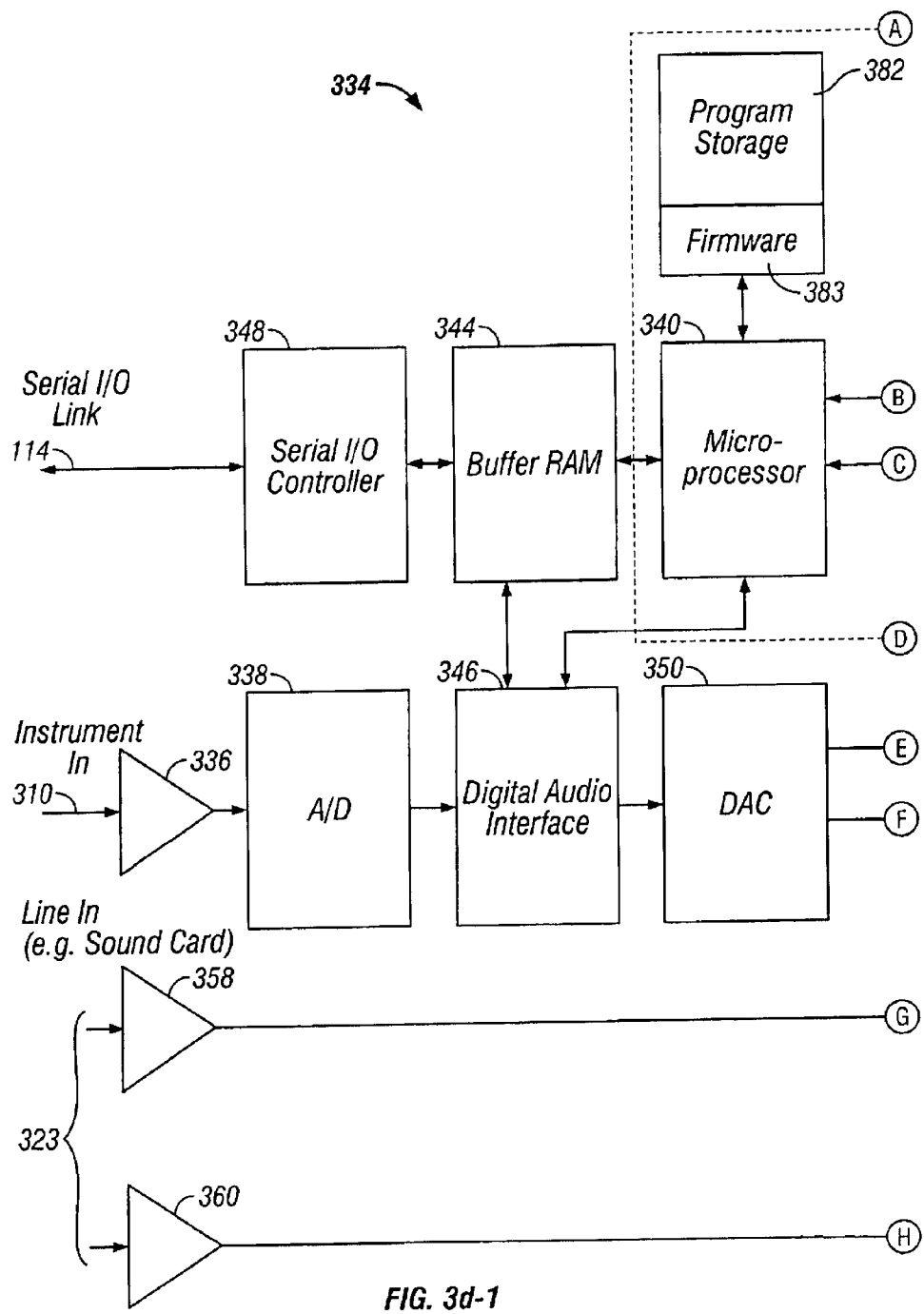
FIG. 3d is a schematic view of the internal components of the interface device, according to one embodiment of the present invention.
Figures 2, 3D:
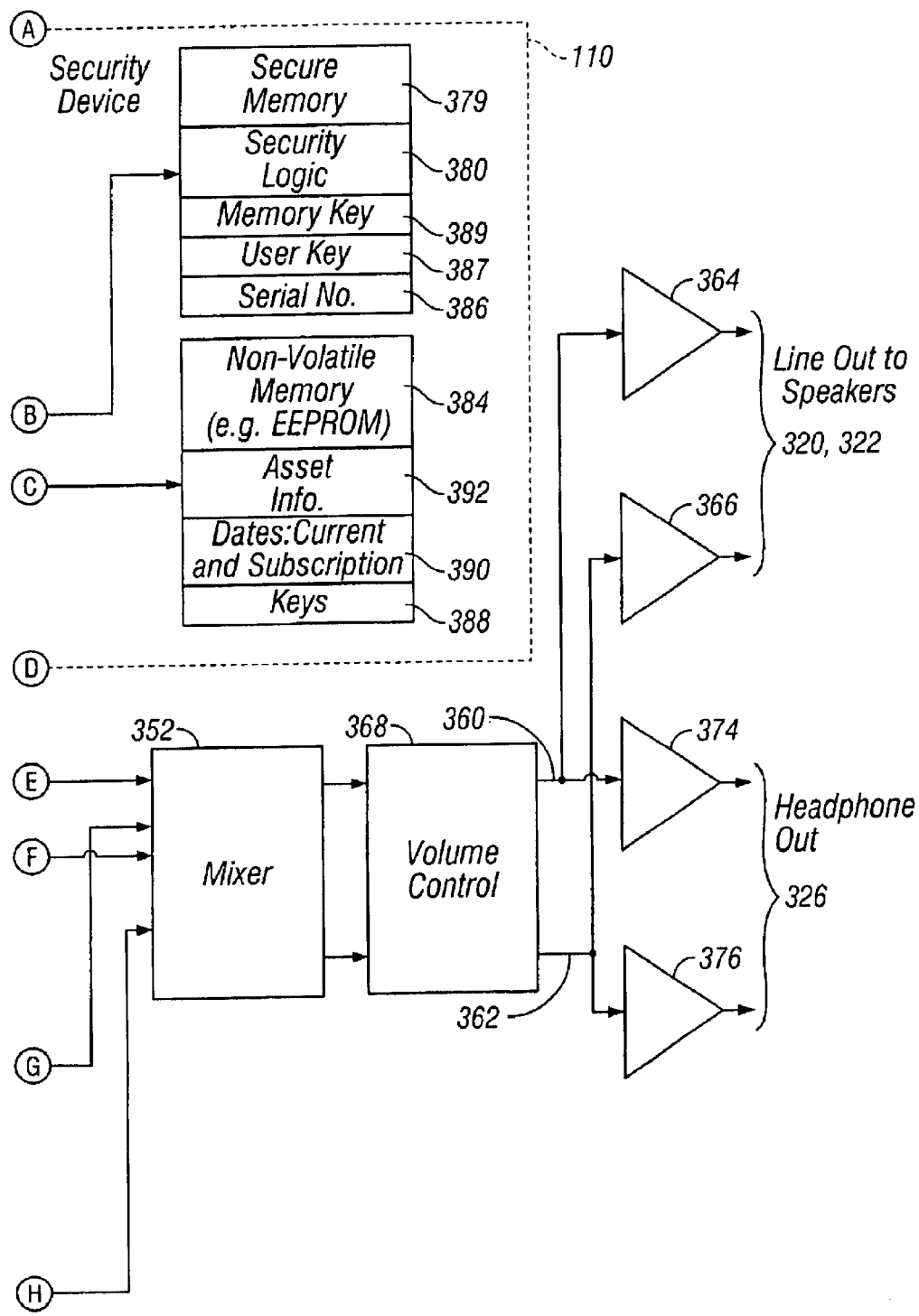

Turning now to FIG. 3d, FIG. 3d is a schematic view of the internal components 334 of the interface device 106, according to one embodiment of the present invention. The interface device 106 includes a microprocessor 340 that controls components of the interface device 106 to perform functions related to A/D and D/A conversion of signals between the musical instrument 112 and the computing device 102, as well as security functions utilizing a security device 110, as will be discussed in more detail later.

As shown in FIG. 3d, the interface device 106 includes an instrument in line from input port 310 that is connected to an amplifier 336. Thus, as an example, an analog audio signal from a musical instrument 112 coming in from input port 310 is amplified by amplifier 336. The amplifier 336 is connected to an analog to digital (A/D) converter 338 such that the amplified analog audio signal is processed by the A/D converter 338 and is converted into a digitized audio signal of the musical instrument.

The microprocessor 340 of the interface device 106 is coupled to components of the security device 110, a buffer RAM 344, and a digital audio interface 346. The microprocessor 340 controls components 334 of the interface device 106 to perform functions related to A/D and D/A conversion of signals between the musical instrument 112 and the computing device 102. The digital audio interface 346 performs conventional functions related to formatting and timing the digitized audio signals. The digital audio interface 346 may include a number of timing clocks to perform these functions. Thus, continuing with the present example, the digitized audio signal of the musical instrument 112 is next formatted by the digital audio interface 346. Further, the digital audio interface 346 is coupled to a buffer RAM 344 that is used to store portions of the digitized audio signal for rate matching.

Moreover, the buffer RAM 344 is connected to the microprocessor 340 and a serial I/O controller 348. The serial I/O controller 348 controls the flow of digital data to and from the computing device 102 along serial I/O link 114. In one example, the serial I/O controller 348 can be a USB controller and the serial I/O link 114 can be a USB link. The digital data controlled by the serial I/O controller 348 can include the digitized audio signal coming directly from the musical instrument 112 which is being sent to the computing device 102 for digital signal processing (DSP) and the mixed digital signal of both the processed digital audio signal of the musical instrument that has undergone DSP by the computing device 102 and the digital audio file associated with selected musical piece coming from the computing device 102. However, it should be appreciated that the digitized signal of the musical instrument does not have to be passed through the computing device 102 for DSP processing and can be passed straight through to the DAC 350 and onto the analog sound device such that the user can still play along with an audio file. The buffer RAM 344 is also used to store the digital audio signal of the musical instrument (pre-DSP processing), the digital audio file, and the mixed digital signal, for conventional purposes, such as rate matching.

The digital audio interface 346 is further connected to a digital to analog converter (DAC) 350. The mixed digital signal of both the processed digital audio signal of the musical instrument and the digital audio file from the computing device 102 are processed by the DAC 350 to convert this mixed digital signal into analog form, i.e. a mixed analog audio signal, such that the mixed analog audio signal can be played back through an analog sound device, such as amplified speakers 120 or headphones 122. However, as previously discussed, it should be appreciated that the digitized signal of the musical instrument does not have to be passed through the computing device 102 for DSP processing and can be passed straight through to the DAC 350 and onto the analog sound device such that the user can still play along with an audio file.

Connected to the outputs of the DAC 350 is a mixer 352. The mixer 352 receives analog audio signal inputs from other line in sources such as the line in port 323, which are amplified by amplifiers 358 and 360, respectively, such that they can also be played through the amplified speakers 120 or headphones 122.

These additional analog audio signal inputs from line in port 323 can be mixed with the analog audio signal of the musical instrument and the audio file or can simply be routed through the interface device to the speakers 120 or headphones 122. For example, the additional line in inputs from line in port 323 can be from a sound card of the computing device 102 such that sounds from games and other software programs from the computing device 102 can simply be routed through the interface device 106 to the speakers 120 or headphones 122. In this way, other software programs can still be used with the interface device 106 hooked up to the computing device 102 (e.g. a personal computer), and the user does not have to reconfigure his or her personal computer system to switch between using the interface device and not using the interface device.

The analog signals from the mixer 352 are then passed through line outs (e.g. left and right) 360 and 362 via speaker ports and 320 and 322 to the amplified speakers 120. Particularly, the analog signals can be amplified by amplifiers 364 and 366 under the control of a volume controller 368, which is in turn controlled by the volume dial 304. Similarly, the analog signals from the mixer 352 are also passed through the line outs 360 and 362 (e.g. left and right) via headphone port 326 to the headphones 122. Likewise, the analog signals can be amplified by amplifiers 374 and 376 under the control of the volume controller 368, which is in turn controlled by the volume dial 304.

Thus, the interface device 106 couples a musical instrument 112 to a computing device 102 over an input/output (I/O) link 114 such that the user can play a musical instrument 112 in conjunction with a multimedia presentation of an audio file being processed by the computing device 102. More specifically, as previously described, the interface device 106 performs analog to digital (A/D) conversion of the audio signal from the musical instrument 112 and transmits the digitized audio signal of the musical instrument via I/O link 114 to the computing device 102 where the digitized audio signal of the musical instrument 112 may undergo digital signal processing (DSP) performed by a software module (e.g. to tailor it to the audio file of the musical piece that was selected by the user). A mixed digital signal of both the digital audio file and the processed digital signal of the musical instrument is transmitted back from the computing device 102 along I/O link 114 to the interface device 106 where the mixed digital signal is converted to analog form (D/A conversion), i.e. a mixed analog audio signal, which is outputted through the speakers 120 or headphones 122. Thus, a user can play along with the downloaded musical piece, which is presented in a multimedia presentation format on the computing device, as will be discussed later, to facilitate learning by the user.

Interface device 106 also includes a security device 110. The security device 110 includes components that can be utilized to uniquely identify the interface device 106 to the server 104 such that access to the server 104 is only granted to a user operating with an authorized interface device. Moreover, the security device 110 in conjunction with the server 104, is used to ensure that audio files are properly encrypted and decrypted such that only a properly authorized interface device 106 can receive and utilize audio files. This protects against unauthorized duplication of licensed material and provides a secure revenue opportunity for content (e.g. audio file) providers.

The security device includes a microprocessor 340, a secure memory 379 having security logic 380, program storage 382 to store security firmware 383, and nonvolatile memory (e.g. EEPROM) 384. Generally, the security firmware 383 when executed by the microprocessor 340 in conjunction with the secure memory 379 and the nonvolatile memory 384, provide for secure operations that allow the server 104 to uniquely identify the interface device 106 and allow the computing device 102 in conjunction with the interface device 106 to decrypt audio files specifically encrypted for use by the authorized interface device 106. The secure memory 379 includes both read-only memory (ROM) and writeable memory, which can be locked and unlocked for reading and writing using the hardware implemented security logic 380.

A user key 387 associated with serial number 386 of the interface device 106 is used by the security logic 380 to authenticate the interface device 106 to the server 104. Also, a memory key 389 is used by the security logic 380 to initially unlock the secure memory 379. The serial number 386, user key 387, and memory key 389 are sealed in the secure memory 379 during manufacturing and thereafter can no longer be written over once the secure memory 379 is sealed. The serial number 386, user key 387, and memory key 389 are also stored at the server's user information database 109 so that the server 104 can initially generate a challenge and response to uniquely authenticate the interface device 106 and open and lock the secure memory 379 and the nonvolatile memory 384, as will be discussed in more detail later.

The nonvolatile memory 384 is used as an extension to the secure memory 379. The firmware 383 prevents access to the nonvolatile memory 384 unless the secure memory 379 has also been unlocked. The nonvolatile memory 384 has hardware write protection, which is controlled by the firmware 383. The nonvolatile memory 384 stores keys 388 such as asset encryption keys (e.g. audio file keys) associated with particular purchased assets (e.g. audio files), the current date and subscription dates for certain assets 390, and asset information (e.g. information about assets) 392. It should be appreciated that the serial number 386, the user key 387, the memory key 389, keys 388, the dates 390, the asset information 392 and even the firmware 383 can instead be located or co-located at any of the security device memories: program storage 382, secure memory 379, or nonvolatile memory 384; this particular arrangement being only one embodiment.

As will be discussed in more detail later, the security device 110 in conjunction with the computing device 102 and the server 104, allow the server 104 to uniquely identify the interface device 106 and allow the computing device 102 in conjunction with the interface device 106 to decrypt audio files specifically encrypted for use by the authorized interface device 106, along with many other functions.

Figure 4:
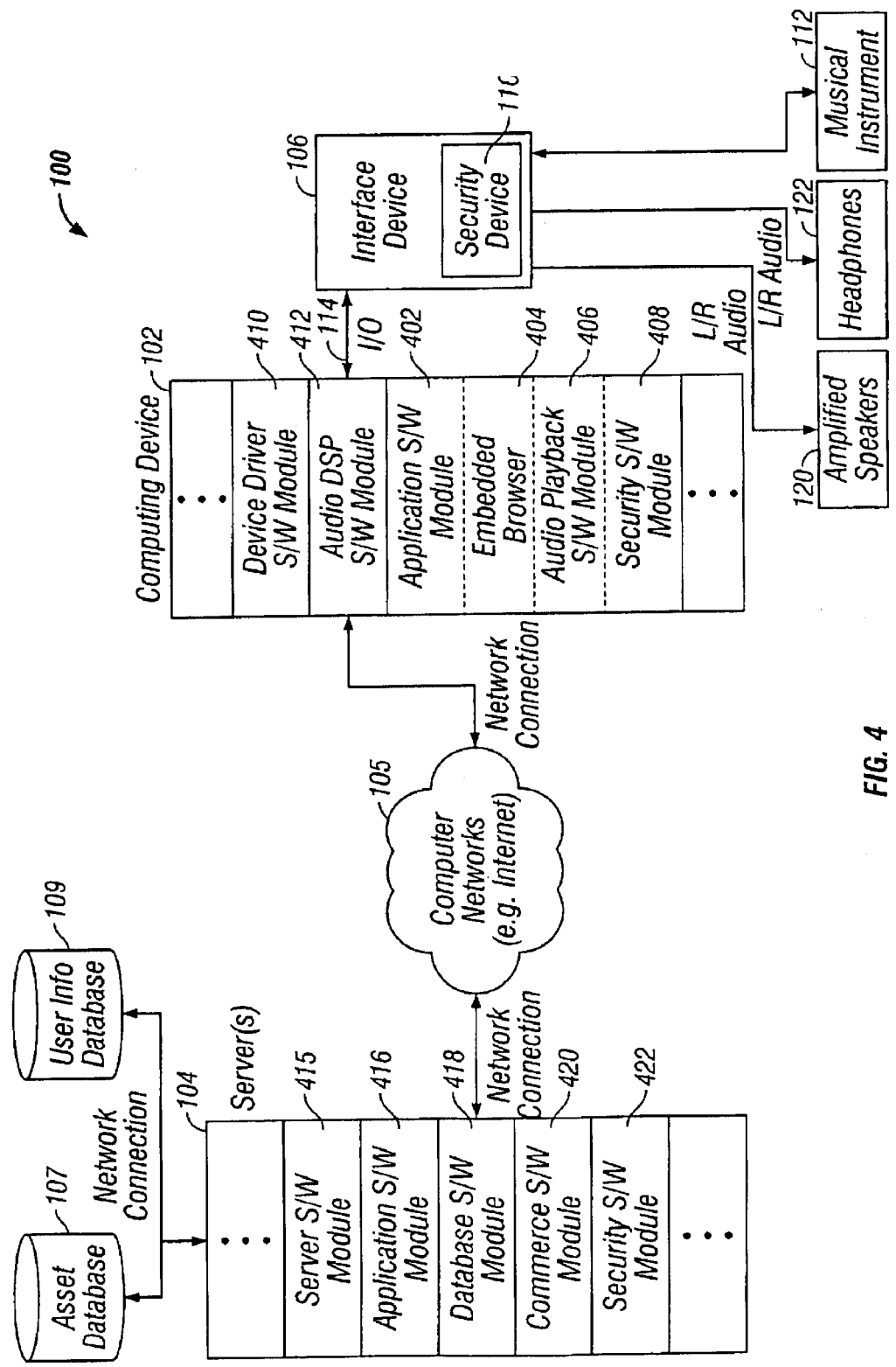
FIG. 4 is a block diagram illustrating a more detailed view of the exemplary system to deliver a multimedia presentation of an audio file to a computing device of FIG. 1, showing typical software modules utilized, according to one embodiment of the present invention.

FIG. 4 is a block diagram illustrating a more detailed view of the exemplary system 100 to deliver a multimedia presentation of an audio file to a computing device 102, showing typical software modules utilized, according to one embodiment of the present invention. Briefly, as previously discussed, server(s) 104 are coupled to computing device 102 through a computer network (e.g. the Internet) 105. Further, an interface device 106 is coupled to the computing device 102 and a musical instrument 112 is coupled to the interface device. In one embodiment, in response to a user selecting the musical piece at a computing device 102, server 104 transmits a session file associated with a musical piece to the computing device 102 through the computer network (e.g. the Internet) 105. The session file includes an audio file and multimedia data. The computing device 102 processes the session file to present the multimedia presentation of the audio file to the user such that a user can play a musical instrument 112 in conjunction with a multimedia presentation of the audio file being processed by the computing device 102.

More particularly, as shown in FIG. 4, the computing device 102 and server 104 each include a plurality of software modules that enable the functions of the embodiments of the present invention. These software modules typically include application programs that aid the user in utilizing the computing device 102 and the server 104, and the various functions associated with delivering a multimedia presentation of an audio file to a computing device 102 for display to user, and to allow the user to play a musical instrument in conjunction with the multimedia presentation, as well as, other functions related to security and commerce methods, as will be discussed. For example, the computing device 102 includes an application software module 402 that further includes an embedded browser 404, an audio playback software module 406, and a security software module 408. Further the computing device 102 includes a device driver software module 410 and an audio DSP software module 412. On the server side, the server 104 includes a server software module 415, an application software module 416, a database software module 418, a commerce software module 420, and a security software module 422.

The application software module 402 of the computing device 102 interfaces and controls the implementation of the embedded browser 404 and all the other software modules (e.g. the audio DSP software module 412, the audio playback software module 406, the device driver software module 410 and the security software module 408) such that the embodiments of the invention related to displaying a multimedia presentation of an audio file to a user to allow the user to play a musical instrument in conjunction with a multimedia presentation, as well as other functions related to security and commerce functions, are properly implemented. In one embodiment, the application software module 402 in conjunction with the embedded browser 404 initially displays a Web page (e.g. a home page) to the user providing the user with a multitude of musical pieces from which to select. The embedded browser 404 is specifically tailored for the application software module 402 and its various functions and can be based on any type of conventionally known browsers such as Microsoft Explorer.

The application software module 402 also causes the display of a control panel graphical interface for a musical instrument 112 that includes settings that define sound characteristics for the musical instrument. The control panel graphical interface also allows the user to set sound characteristics for the musical instrument 112. Further, in response to the multimedia data of the session file for a selected musical piece (e.g. selected by the user) sent to the computing device 102 by the server 104, the application software module 402 sets the settings of the control panel graphical interface to predefined values to model the sound characteristics of the musical instrument associated with the audio file for the musical piece selected by the user. Also, the application software module 402 can play a musical piece selected by the user (e.g. and sent from the server 104 to the computing device 102), that has a track associated with the user's musical instrument removed from the audio file, such that the user can play his or her musical instrument 112 in conjunction with a multimedia presentation of the audio file that does not include the user's musical instrument. Moreover, the application software module 402 processes the multimedia data of the session file to cause the display of music notation associated with the audio file of the musical piece to the user. The display of the multimedia presentation may occur on a display device 204 of the computing device 102 and sound can be routed through the amplified speakers 120 of the interface device 106.

In order to accomplish these functions, the application software module 402 utilizes a conventional device driver software module 410, an audio DSP software module 412, and an audio playback software module 406. The audio DSP software module 412 processes the audio signal of the musical instrument 112 (e.g. utilizing DSP algorithms) such that the user can set the sound characteristics for the musical instrument. As previously described, the audio DSP software module 412 can be utilized by the application software module 402 to set the settings of the control panel graphical interface to predefined values to model the sound characteristics of the musical instrument such that it is properly associated with a musical piece selected by the user. Furthermore, the audio DSP software module 412 combines both the digital audio file and the processed digital audio signal of the musical instrument to create the mixed digital audio signal, previously discussed. Moreover, the application software module 402 controls an audio playback software module 406 to control the transmission of the mixed digital signal of the digital audio file and the digitally processed sound of the musical instrument 112 back to the interface device 106 where it is played back through amplified speakers 120 or headphones 122 to the user. However, the application software module 402 can also control the audio playback software module 406 to control the transmission of only the digital audio file, in the case where the musical instrument is only routed through the interface device 106 and not the computing device 102 for processing. It should be appreciated audio DSP software modules for a variety of different musical instruments are known in the art. For example, general types of DSP software modules that can alter MIDI files are well known (e.g. MIDI SHOP). Also, audio playback software modules that are used to playback audio files and audio signals from musical instruments are also well known.

In one particular embodiment, that will hereinafter be used to describe aspects of the present invention, the application software module 402, the audio DSP software module 412, the Web page the user logs on to, and the control panel graphical interface are directed to support a guitar as the musical instrument 112. In particular, it should be appreciated that DSP algorithms for altering the audio signals from a guitar are known in the art and can be easily implemented in software on the computing device 102. For example, one example of DSP algorithms for altering the audio signals from a guitar to model various amplifiers and speaker cabinet configurations which may be used in the audio DSP software module 412 to implement aspects of the present invention are particularly described in U.S. Pat. No. 5,789,689 entitled "Tube Modeling Programmable Digital Guitar Amplification System", which is hereby incorporated by reference. Moreover, a wide variety of software implemented control panel graphical interfaces for a multitude of different instruments are known, and there are some basic control panel graphical interfaces known for guitars, e.g. AMP FARM includes one type of software implemented control panel graphical interface for a guitar. However, none of them include many of the novel and non-obvious features of the guitar control panel graphical interface to be described in more detail later. Furthermore, the aspects of the security software module 408 of the computing device 102 will also be described in more detail later.

In one embodiment of the present invention, the server 104 includes a server software module 415, an application software module 416, a database software module 418, a commerce software module 420, and a security software module 422. The application software module 416 interfaces and controls the implementation of the server software module 415 and all the other software modules (e.g. the database software module 418, the commerce software module 420, and the security software module 422), at the server 104 such that the embodiments of the invention related to displaying a multimedia presentation of an audio file to a user to allow the user to play a musical instrument in conjunction with the multimedia presentation, as well as other functions related to security and commerce functions, are properly implemented.

At the server 104, the application software module 416 in conjunction with the server software module 415 provides the computing device 102 with the data necessary to implement the functions of the invention, as will be discussed. The server software module 415 can be conventional server software for transmitting and receiving data to and from computing devices 102. For example, using the Hypertext Transfer Protocol (HTTP) and Hypertext Markup Language (HTML) or Extensible Markup Language (XML), the server 104 can communicate with the computing device 102 across the computer network 105 to provide various functions and data to the user. At the computing device 102, utilizing the embedded browser 404, which is part of the application software module 402, or even other browsers such as Netscape™ Navigator™ published by Netscape™ Corporation of Mountain View, Calif., the Internet Explorer™ published by Microsoft™ Corporation of Redmond, Wash., the user interface of America Online™, or any other browser or HTML/XML translator from a well-known supplier, computing device 102 may supply data to, and access processed or unprocessed data from, the server 104.

According to one embodiment of the present invention, as previously discussed, the server software module 415 under the control of the application software module 416 transmits a session file to the computing device 102 through the computer network 105, in response to user selecting a musical piece at the computing device 102. The session file includes an audio file and multimedia data such that the computing device 102 can process the session file to present a multimedia presentation to the user to allow the user to play his or her musical instrument 112 (e.g. a guitar) in conjunction with the multimedia presentation of the audio file. Moreover, as will be discussed, the server software module 415, under the control of the application software module 416, receives and transmits a variety of different types of data to and from the computing device 102 to implement the functions of the invention.

The database software module 418 can be conventional database software, such as MySQL, to control the input and output of data from the asset database 107 and the user information database 109, under the control of the application software module 416, as will be discussed in more detail later. Furthermore, the aspects and functions of the commerce software module 420 and security software module 422 will be discussed in more detail later.

The data communicated between the server 104 and the computing device 102 includes session files having multimedia data and audio files, user information, commerce information to track the purchases and licensing restriction of audio files and other items, security information including encrypted keys and encrypted asset and audio files, multimedia data for the presentation of a Web-site, along with a multitude of other data. Much of the information related to session files, multimedia data, audio files, commerce information, and other assets, as will be discussed, may be stored in the asset database 107. User information including the user's name, email address, home address, computer connection speed, credit card number, subscription information, type of computer, the type of musical preferences the user has, and security information including a user's serial number for his or security device 110, user key, memory key, and other user information, as will be discussed, may be stored in the user information database 109. It will be readily appreciated by those having ordinary skill in the relevant arts that the asset database 107 and user information database 109 may be stored in storage devices including various mass storage devices such as one or more DASD arrays, tape drives, optical drives, or the like, and that the aforementioned information may be stored in any one of a variety of formats or data structures.

In one particular embodiment, that will hereinafter be used to describe some of the aspects of the present invention, the computing device 102, the server 104 and its associated asset and user information databases 107 and 109, and the interface device 106, along with the associate software modules, are used to support a guitar 112 as the musical instrument. However, it should be appreciated by those skilled in the art that the present invention may be used to support any type of musical instrument. Moreover, it should be appreciated that the present invention can also support the case where a microphone is used as the musical instrument and the input audio signal is a human voice such that embodiments of the invention could operate as a virtual karaoke machine. These aspects will be further appreciated after a further reading of the disclosure.

Figure 5A:
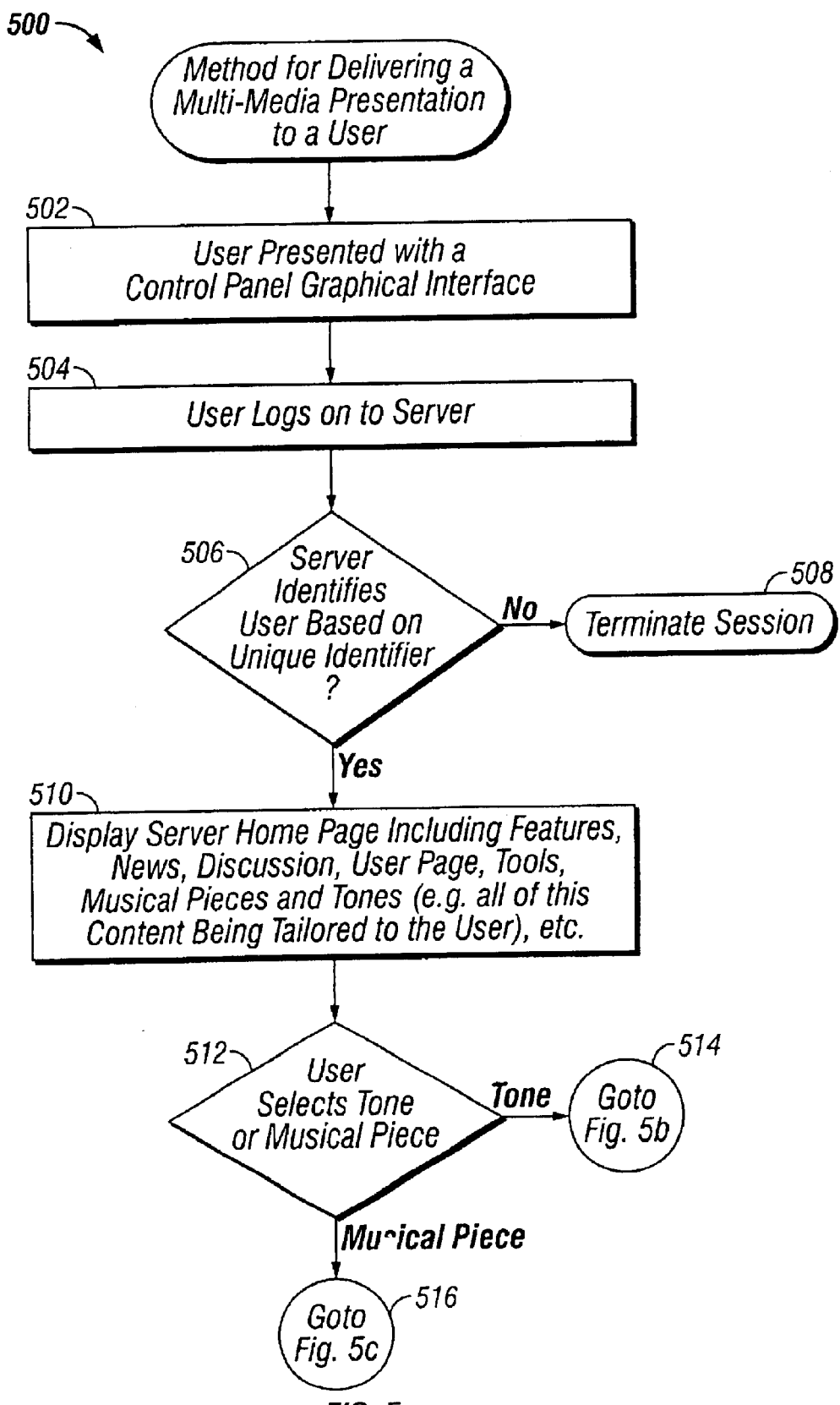
FIG. 5a is a flowchart illustrating a method for delivering a multimedia presentation to user, according to one embodiment of the present invention.
Figure 6A:
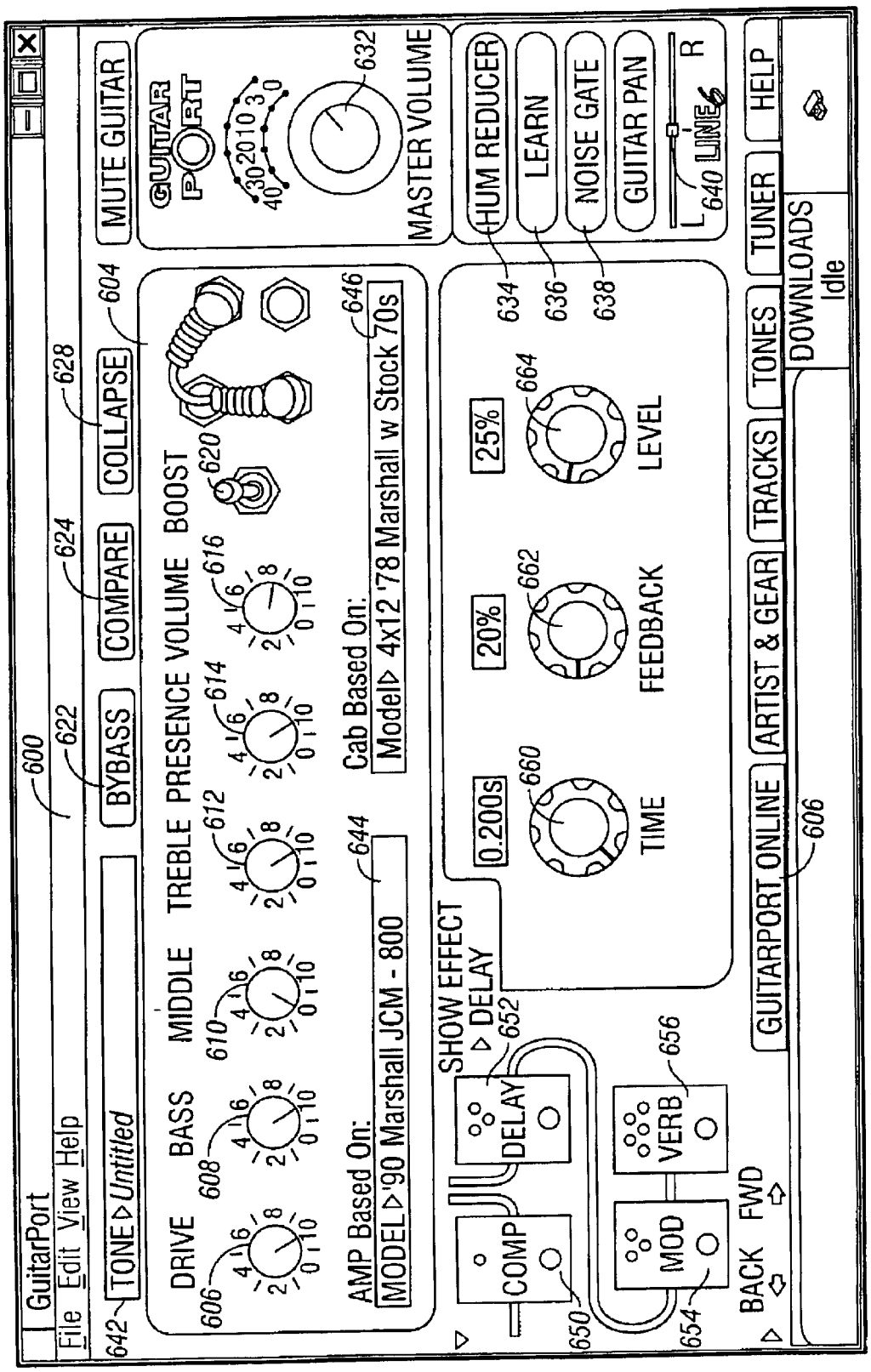
FIG. 6a is a screenshot particularly illustrating the control panel graphical interface for a guitar (e.g. for the embodiment where the musical instrument is a guitar), according to one embodiment of the present invention.

With reference also to FIG. 5a, FIG. 5a is a flowchart illustrating a method 500 for delivering a multimedia presentation to a user, according to one embodiment of the present invention, utilizing the previously described exemplary system 100 of FIG. 4. At block 502, after a user has loaded the application software module 402 onto his or her computing device 102, the application software module 402 presents the user with a control panel graphical interface 600 as shown in FIG. 6a. For example, the control panel graphical interface 600 can be displayed on the display device 204 of the computing device 102. Next, the computing device 102 utilizing the application software module 402 permits the user to log onto the server 104 and to access the server. According to one particular guitar embodiment, to be discussed hereinafter, the server presents the user a Web-site related to guitars, hereinafter termed the GUITARPORT Web-site. Thus, the user is first presented with a GUITARPORT homepage and other GUITARPORT Web pages thereafter.

With reference also to FIG. 6a, logging on to the server 104 can be accomplished by the user selecting the GUITARPORT online button 606. For example, the computing device 102 can contact the server 104 through the computer network (e.g. the Internet) utilizing standard computer network protocols (e.g. TCP/IP). At block 506, the server 104 under the control of the application software module 416 and in conjunction with the security software module 422 identifies the user based on a unique identifier from the security device 110 (e.g. the Serial No. of the interface device 106) to determine whether access to the server 104 should be authorized. These security features will be discussed in more detail later. If the user is not authorized by the server 104, then the session is terminated at block 508. However, if the user is authorized to utilize the server 104, then the method 500 moves on to block 510.

Figure 5B:
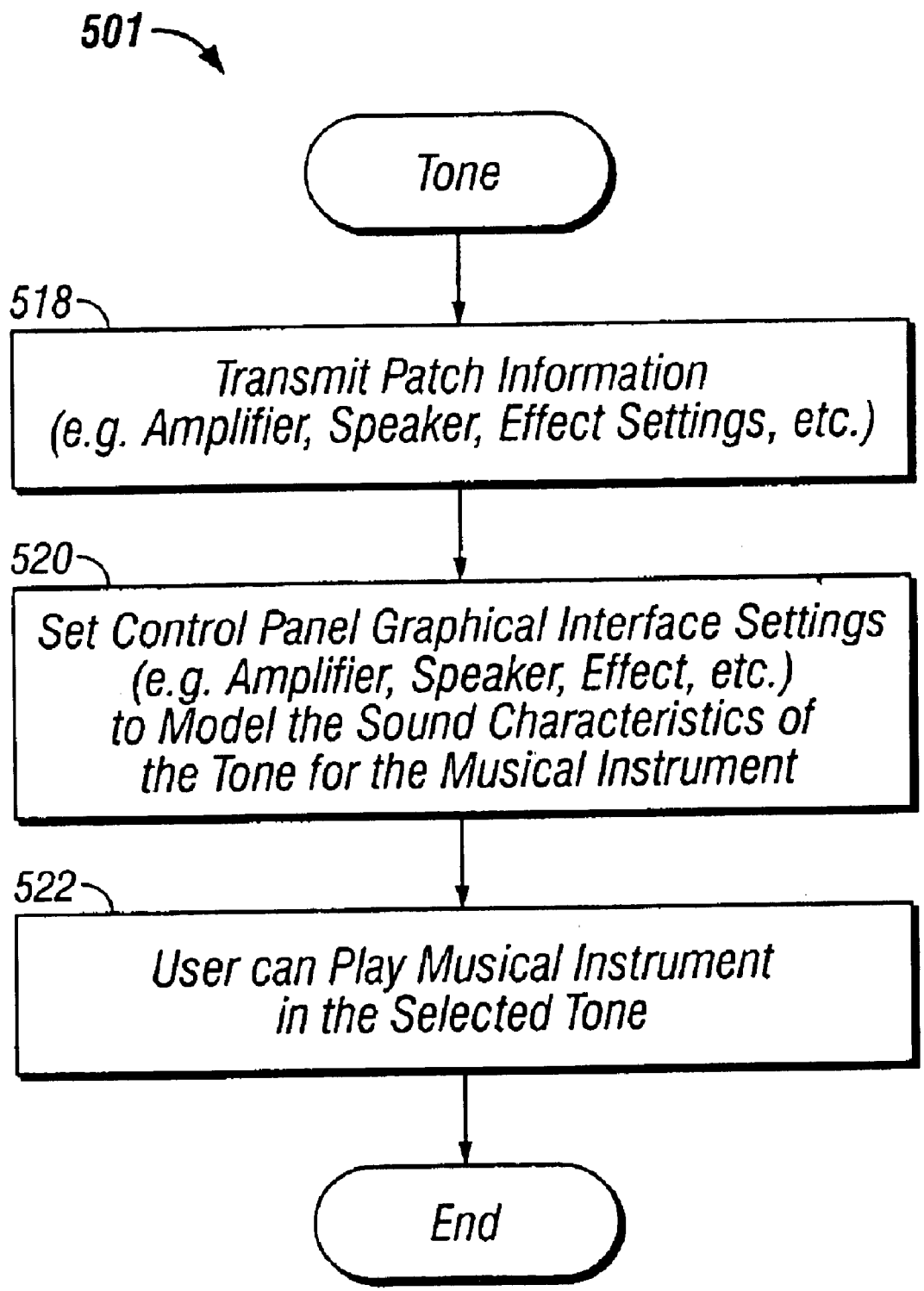
FIG. 5b is a flowchart illustrating a method of providing a tone to a user, according to one embodiment of the present invention.
Figure 5C:
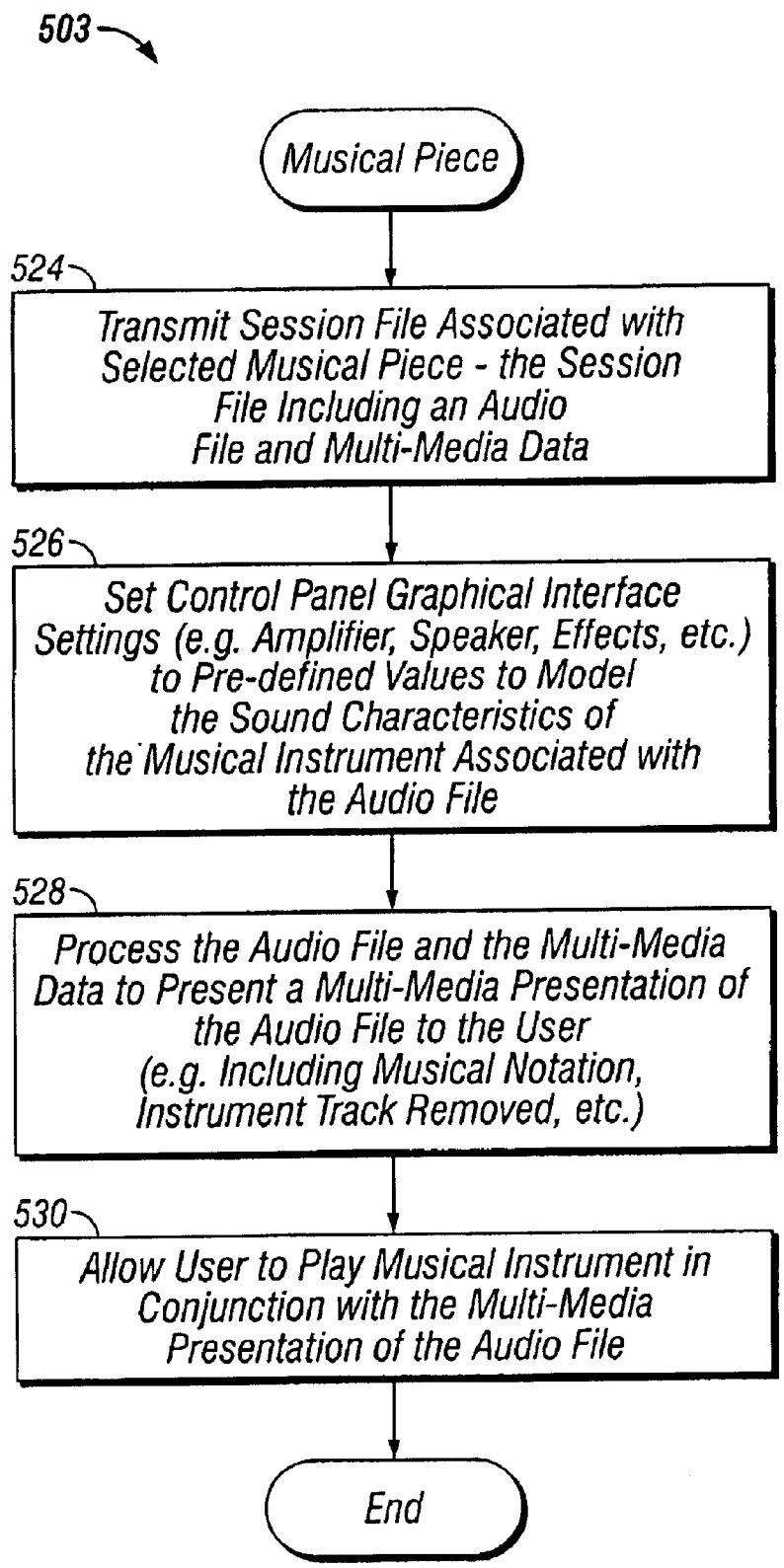
FIG. 5c is a flowchart illustrating a method of providing a musical piece to a user, according to one embodiment of the present invention.
Figures 1, 6B:
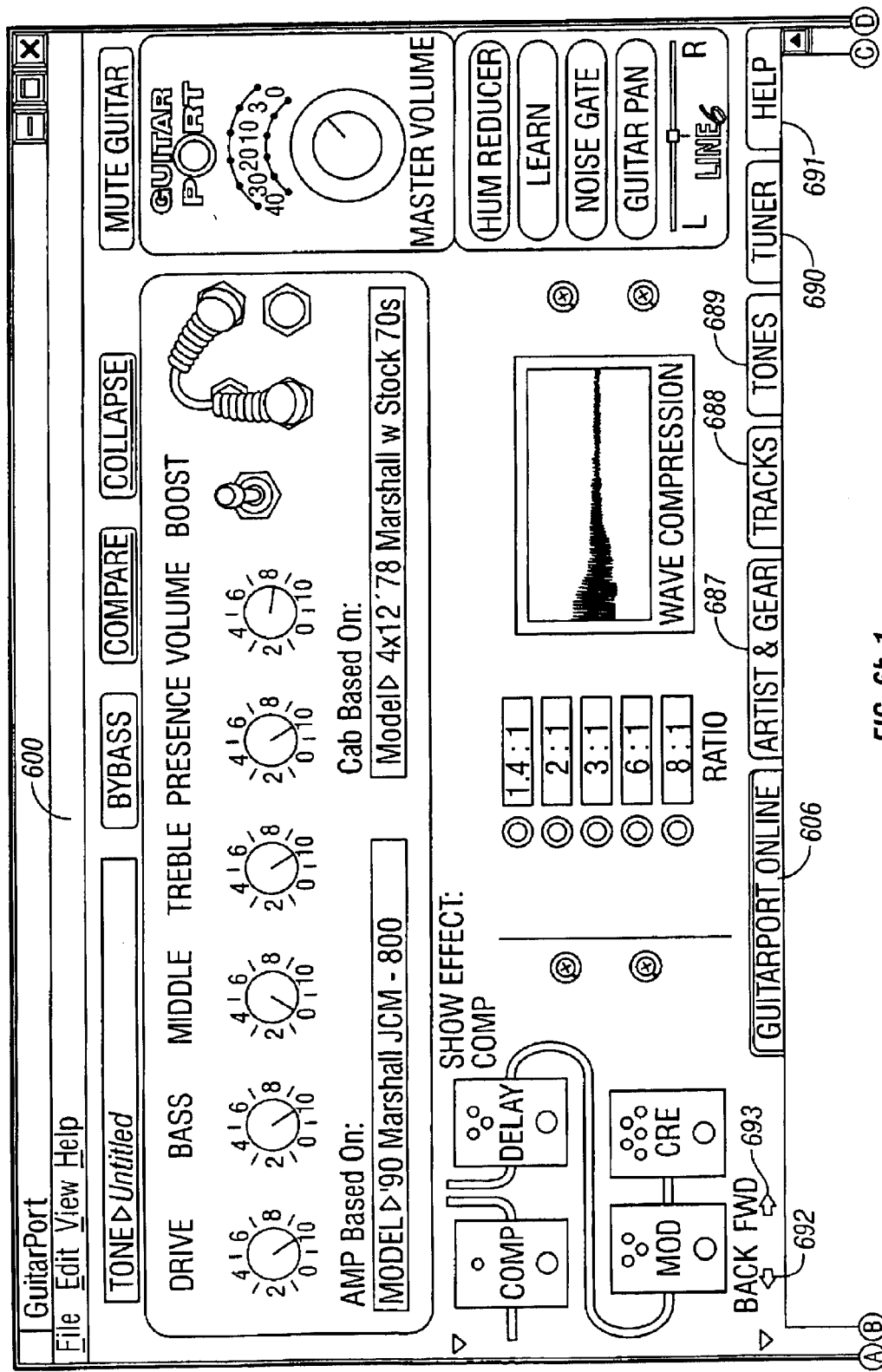
FIG. 6b is a screenshot of the display illustrated to the user when they successfully log on to the server, according to one embodiment of the present invention.
Figures 2, 6B:
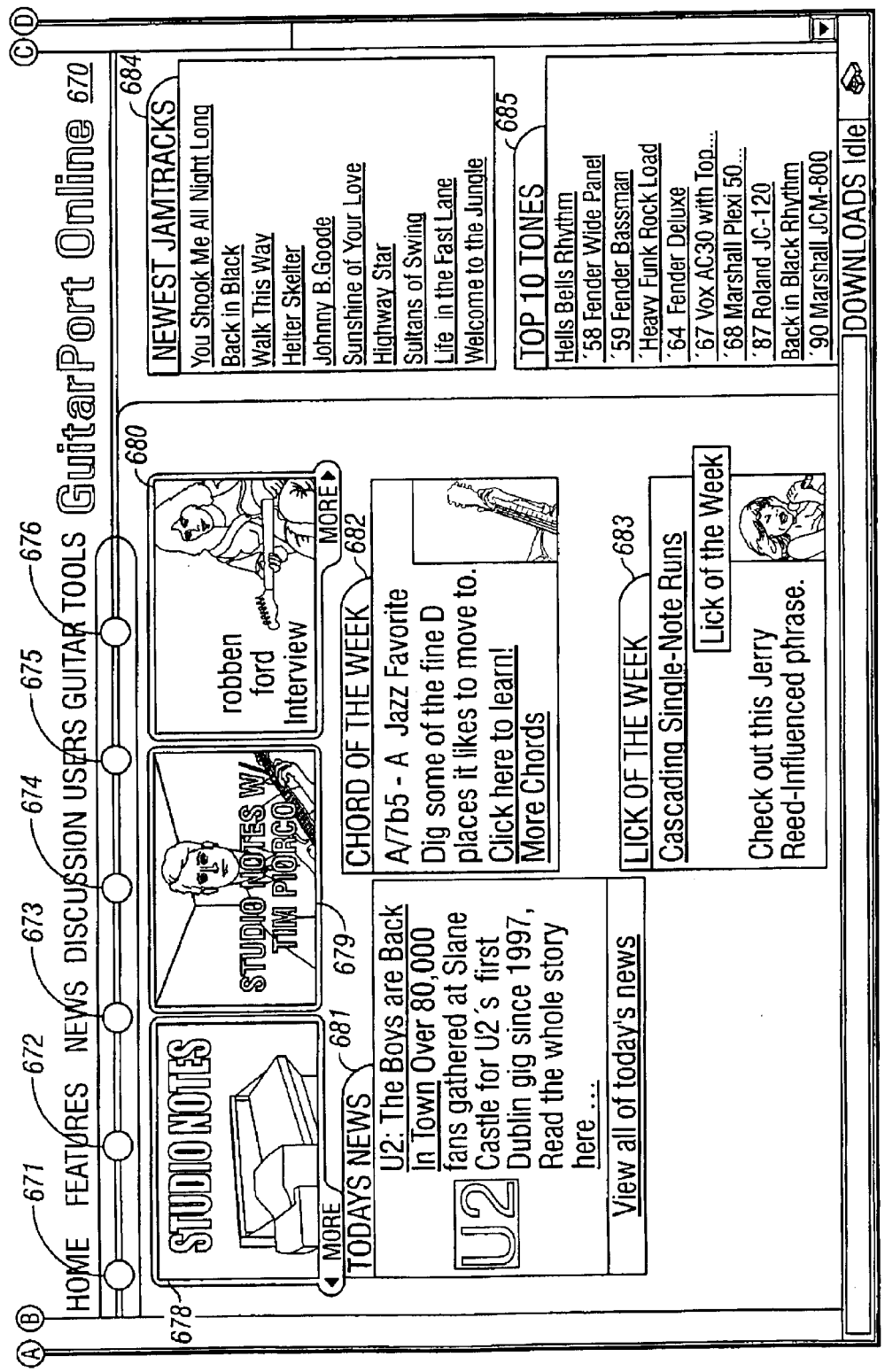

At block 510, the application software module 402 utilizing the embedded browser 404 displays the server the GUITARPORT homepage received from the server 104, as shown in FIG. 6b. The GUITARPORT homepage is initially displayed beneath the guitar control panel graphical interface 600. With reference also to FIG. 6b, the GUITARPORT homepage includes Features, News, Discussion, User Page, Guitar Tools, Musical Pieces (e.g. Newest Jamtracks), and Tones. The GUITARPORT homepage will be particularly discussed later. Moreover, based on user information for the user (e.g. particularly the musical preferences of the user) stored in the user information database 109 at the server 104, the server 104 can particularly tailor the GUITARPORT homepage to fit the musical preferences of the user. For example, if a user prefers rock-and-roll then the Newest Jamtracks (e.g. musical pieces) will be directed towards rock-and-roll musical pieces, as well as, particular rock-and-roll Tones. Further, the other components of the GUITARPORT homepage can also be geared to the user's preference, for example, News, Features, etc. At block 512, the user is allowed to select a Tone or a musical piece (e.g. a Jamtrack). If the user selects a tone then the method 500 proceeds to FIG. 5b at block 514. On the other hand, if the user selects a musical piece (e.g. a Jamtrack) the method 500 proceeds to FIG. 5c at block 516. A Jamtrack is one type of musical piece that can be downloaded from the server 104.

To aid in the explanation of methods of the invention and associated control panel interfaces, some of the control panel graphical interfaces will now be discussed. Referring now to FIG. 6a, FIG. 6a is a screenshot particularly illustrating the control panel graphical interface for a guitar 600. As previously discussed, the application software module 402 generates the control panel graphical interface 600, and in conjunction with the audio DSP software module 412, allows the user to change the settings of the control panel graphical interface (or the settings can be set to predefined settings determined by a session file or a predefined patch) such that the audio DSP software module 412 processes the audio signal from the guitar 112 to match the desired settings. The settings of the control panel graphical interface 600 for a guitar will now be described.

The control panel graphical interface 600 includes a plurality of standard control knobs 604 common to most guitar amplifiers including: a drive control knob 606, a bass control knob 608, a middle control knob 610, a treble control knob 612, a presence control knob 614, and a volume control knob 616. These control knobs are selectable by the user to change the sound of the guitar. The control panel graphical interface 600 further includes a boost switch 620 to increase the power of the audio signal from the guitar. A bypass button 622 when selected turns off the DSP processing such that the straight unprocessed audio signal from the guitar is used. A compare button 624 when selected allows two different control panel graphical interface configurations to be compared side by side. A collapse button 628 when selected reduces the size of the control panel graphical interface 600. A mute guitar button 630 when selected mutes the audio signal from the guitar.

The Master Volume dial 632 controls both the volume of the audio signal of the guitar 112 and the volume of any other audio signals (e.g. from an audio file) currently being processed. Selection of the hum reducer button 634 allows the user to reduce the hum interaction between the guitar 112 and the display device 204. Once the hum reducer button 634 is selected and the learn button 636 is depressed, the computing device 102 measures the hum interaction between the guitar 112 and the display device 204 (e.g. the user can move his or her guitar next to the display device) and DSP processing will compensate for the hum interaction and remove it. The noise gate button 638 when selected attenuates the input audio signal from the guitar, if it is below a threshold level, but does not attenuate the audio signal from the guitar if it is above the threshold level. Thus, the noise gate button 638 may be used to get rid of such things as guitar handling noise. A guitar pan slide 640 may be used to pan the sound of the guitar between the left and right speakers.

Further, as previously discussed, the user may select a tone or a tone may be automatically selected for the user to go along with the musical piece selected by the user. The type of tone selected is showing in the tone field 642. Any number of tones representing amplifier models based on most any type of guitar amplifier (e.g. MARSHALL, FENDER, VOX, ROLAND, etc.), most any type of speaker cabinet, and most any type of effect can be reproduced. For example, tones for the Hells Bells rhythm section by AC/DC, a heavy funk rock lead, a '64 Fender Deluxe, or any other tone may be selected (e.g. see Top 10 Tones 685 (FIG. 6b)) or created by the user. In particular, it should be appreciated that DSP algorithms for altering the audio signals from a guitar 112 are known in the art and can be easily implemented in software on a computing device 102. For example, one example of DSP algorithms for altering the audio signals from a guitar to model various amplifiers and speaker cabinet configurations which may be used in the audio DSP software module 412 to implement aspects of the present invention is particularly described in U.S. Pat. No. 5,789,689 entitled "Tube Modeling Programmable Digital Guitar Amplification System", which is hereby incorporated by reference.

Typically, a tone can be defined by the guitar amplifier, the speaker cabinet, and a number of different effects, as well as other settings. Again the tone can be selected by the user, created by the user, or can be preset to go along with the selected musical piece. The type of guitar amplifier tone being modeled is shown in the amplifier model field 644 (e.g. '90 Marshall JCM-800). The speaker cabinet configuration tone being modeled is shown in the speaker cabinet model field 646 (e.g. 4×12 '78 Marshall with Stock 70s). The speaker cabinet configuration 646 emulates the effects of a speaker cabinet on the amplified guitar sound. Further, a number of a digitally reproduced well known effect boxes are provided by the control panel graphical interface 600 to create tones. Particularly, a compression effect box 650, a delay effect box 652, a modulation effect box 654 (e.g. including chorus, flanger, rotary, tremolo, etc.), and a reverb effect box 656 are provided. Effect boxes are typically found in additional digital audio instrument processors that are coupled to a guitar and a standard amplifier. Also, this particular control panel graphical interface 600 shows that the delay effect box 652 is currently selected and shows specific attributes of the delay effect such as delay time 660, feedback percentage 662, and level percentage 664. Moreover, as previously discussed, a user can log on to the GUITARPORT Web-site by selecting the GUITARPORT online button 606.

Turning now to FIG. 6b, FIG. 6b is a screenshot of the display illustrated to the user when they successfully log on to the server 104, according to one embodiment of the present invention. Particularly, the application software module 402 and the embedded browser 404 display the GUITARPORT homepage 670 received from the server 104, which is located below the control panel graphical interface 600, and in conjunction with the data received from the server 104, perform many of the functions requested by the user. It should be noted that control panel graphical interface 600 is the same as that shown in FIG. 6a, except that in this instance, the compression effects box has been selected and a compression effects window (e.g. allowing for the selection of different compression ratios) is shown.

As shown in FIG. 6b, the GUITARPORT homepage 670 includes a Home button 671, a Features button 672, a News button 673, a Discussion button 674, a Users button 675, and a Guitar Tools button 676. When the home button 671 is selected by a user, the user is returned to the GUITARPORT homepage. Depression of the Features button 672 brings the user to a Features page, which includes such things as interviews with artists, studio notes, and other articles related to the field of music that the user may find useful. Selection of the News button 673 brings the user to a News page that provides news articles related to the field of music and guitars in particular. When the user picks the Discussion button 674, the user is brought to a bulletin board that allows users to post messages (e.g. questions, answers, news, articles, etc.) in any subject but is usually related to music and guitars in particular. Selection of the Users button 675 provides the user with a user page that allows the user to update their user profile (e.g. name, address, type of subscription, musical preferences, etc.). Depression of the Guitar Tools button 676 brings the user to a utility page that provides the user with information related to guitar playing, for example: what is the figuring for a C chord, how do I set up my amplifier, etc. This can be accomplished by frequently asked questions (FAQ) listings, a searchable database, email questions to a guitar technician, etc.

The GUITARPORT homepage can also be populated with selectable icons representing links to new articles, interviews, news, chords, guitar licks, Newest Jamtracks (e.g. musical pieces), and the most popular Tones. For example, FIG. 6b shows selectable Studio Notes icon links 678 and 679, a selectable Interview icon link 680, a selectable Today's News icon link 681, a Chord of the Week icon link 682, and a Lick of the Week icon link 683, as well as, Newest Jamtracks (e.g. musical pieces) links 684, and Tone links 685. Moreover, as previously discussed, the GUITARPORT Web-site can be particularly tailored to a user based on user information (e.g. particularly the musical preferences of the user) stored in the user information database 109 at the server 104. With this information, the server 104 can particularly tailor the GUITARPORT Web-site to fit the musical preferences of the user. For example, if a user prefers rock-and-roll, then the Newest Jamtracks 684 (e.g. musical pieces) will be directed towards rock-and-roll musical pieces as well as particular Tones 685. Further, the other components of the GUITARPORT Web-site can also be geared to the user's preference, for example, Studio Notes, Interviews, News, Chord of the Week, Lick of the Week, etc.

Further, the control panel graphical interface 600 has some selectable buttons that interact with the GUITARPORT Web-site. As shown in FIG. 6b, the GUITARPORT online button 606 to connect to the GUITARPORT Web-site is already depressed. An Artist and Gear button 687 is provided, and when selected, provides a user a list of artists from which they can choose, such that the user can find articles written about the artist providing artist biographies and the type of musical gear that they use. The tracks button 688 when selected, provides the user a list of musical pieces (e.g. Jamtracks) that the user can select. In response to a user selecting a musical piece (e.g. Jamtrack), the server 104 transmits a session file associated with the selected musical piece to the computing device 102 through the computer network (e.g. the Internet) 105. The session file includes an audio file and multimedia data. The computing device 102 processes the session file to present a multimedia presentation of the audio file to the user, as will be discussed. The Tone button 689 when selected, provides the user a list of tones that the user can select. In response to a user selecting a tone, the server 104 transmits patch information (e.g. type of amplifier, speaker cabinet, effect settings, etc.) such that the control panel graphical interface 600 is properly configured and the DSP software module 412 properly processes the guitar signal to emulate the proper tone. However, it should be appreciated that with or without a connection to the GUITARPORT Web-site, the user can utilize previously stored tones and musical pieces (e.g. Jamtracks).

Also, the control panel graphical interface 600 has a tuner button 690 that when selected, allows the computing device to act as a chromatic tuner such that user can tune his guitar. The control panel graphical interface 600 also has a Help button 691 that when selected provides standard Help features to the user. Further, the control panel graphical interface 600 has standard Back and Forward arrows 692 and 693 that allow the user to toggle back and forth through previously visited web pages of the GUITARPORT Web-site.

As previously discussed, if the user selects a Tone then the method 500 proceeds to FIG. 5b (block 514). For example, the user can select one of the Tones provided by selecting the Tones button 689 or one of the Top Tones 685 (e.g. Heavy Funk Rock Lead (FIG. 6b)). Turning to FIG. 5b, FIG. 5b is a flowchart illustrating a method 501 of providing a tone to a user, according to one embodiment of the present invention. In response to a user selecting a tone, the server 104 transmits patch information (e.g. type of amplifier, speaker cabinet, effect settings, etc.) to the computing device 102 (block 518). The application software module 402 sets the control panel graphical interface 600 to the proper configuration to model the sound characteristics of the tone for the musical instrument (e.g. the guitar) (block 520). Further, the DSP software module 412 properly processes the guitar audio signal to emulate the proper tone. Thus, the user can play his or her guitar 112 connected through the interface device 106 to the computing device 102 in the proper tone. For example, patches can represent guitar tones for various recording artists (e.g. Jimi Hendrix, Eric Clapton, Jerry Garcia, Chet Atkins, Robert Cray, etc.) or can be particularly created for the GUITARPORT Web-site to represent various guitar styles—rock, country, jazz, etc.

As previously discussed, if the user selects a musical piece then the method 500 proceeds to FIG. 5c (block 516). For example, the user can select one of the musical pieces (e.g. Jamtracks) provided by selecting the Tracks button 688 or one of the Newest Jamtracks 684 (e.g. Welcome to the Jungle (FIG. 6b)). Turning to FIG. 5c, FIG. 5c is a flowchart illustrating a method 503 of providing a musical piece to a user according to one embodiment of the present invention. Particularly, in response to a user selecting a musical piece (e.g. Jamtrack), the server 104 transmits a session file associated with the selected musical piece (e.g. Jamtrack) to the computing device 102 through the computer network (e.g. the Internet) 105 (block 524). The session file includes an audio file and multimedia data.

Figure 5D:
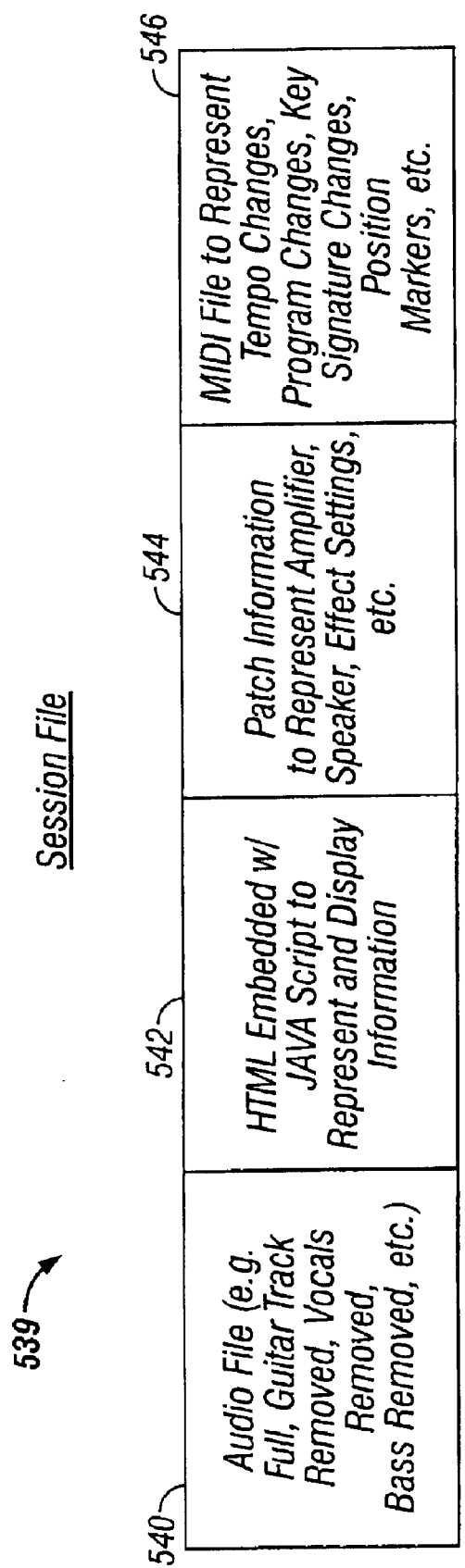
FIG. 5d is a diagram illustrating the contents of a session file, according to one embodiment of the present invention.

Turning briefly to FIG. 5d, FIG. 5d illustrates the contents of a session file 539, according to one embodiment of the present invention. The session file 539 includes an audio file 540 associated with the musical piece (e.g. Jamtrack). The audio file 540 of the musical piece is typically a song that the user wants to play along with. The audio file 540 can be the full song (i.e. with all the instrument tracks and vocal tracks). Alternatively, the audio file 540 can have one or more tracks removed, for example: one or more guitar tracks can be removed, one or more vocal tracks can be removed, one or more bass tracks can be removed, one or more drum tracks can be removed, etc. For example, as will be discussed, the user can select a musical piece (e.g. Jamtrack) with the guitar track removed such that the audio file 540 is played by the computing device 102 and the interface device 106 (e.g. through the amplified speakers 120), with the guitar track removed, so that the user can play along with the song with the guitar track removed.

Further, the session file 539 has a multimedia block 542, which includes HTML data embedded with JavaScript to represent and display multimedia information to the user. Particularly, with brief reference to FIG. 6c, which will be discussed in more detail later, the multimedia data can be processed by the application software module 402 and the embedded browser 404 of the computing device 102 (along with other software modules of the computing device 102) to represent the name of the song or musical piece 601, and the music notation 603 associated with the lead sheet 605, such that the user can play along with the audio file 540 being played. The multimedia data block 542 also includes all the other necessary data to achieve these functions.

The session file 539 also includes a patch block 544 that includes patch information such that the guitar 112 has the proper tone or sound to go along with the associated selected musical piece/audio file 540. The patch information includes the type of amplifier, speaker cabinet, effect settings, etc., such that the guitar settings of the control panel interface 600 are set to go along with the selected musical piece/audio file. The application software module 402 sets the control panel graphical interface 600 to the proper configuration to model the sound characteristics of the tone for the guitar for the particular musical piece/audio file 540. Further, the DSP software module 412 properly processes the guitar signal to emulate the proper tone such that the guitar sound goes along with the musical piece/audio file 540.

Moreover, the session file 539 includes a MIDI file 546 that represents the tempo changes, program changes, key signature changes, position markers, etc., for the selected musical piece/audio file 540. MIDI files are well known in the art. The computing device 102 (e.g. utilizing the application software module 402) interprets the tempo map from the MIDI file during playback to convert the current audio playback position to the corresponding audio file position in the MIDI file for the purpose of determining what events in the MIDI file should occur. Program changes from the MIDI file are used to select patch information 544 to select amplifier, speaker cabinet, and effects settings, etc., for the amplifier controls of the control panel graphical interface 600 that are needed for the particular position in the audio file (e.g. the particular tone for the guitar being emulated using the DSP software module 412). Key signature changes from the MIDI file 546 are used for displaying the current key signature to the user. Markers of the MIDI file 546 are used to cause display events at various points in the musical piece. Each marker in the MIDI file 546 is assigned a text label. The label corresponds to a JavaScript function to be executed when the label is reached.

Figures 1, 6C:
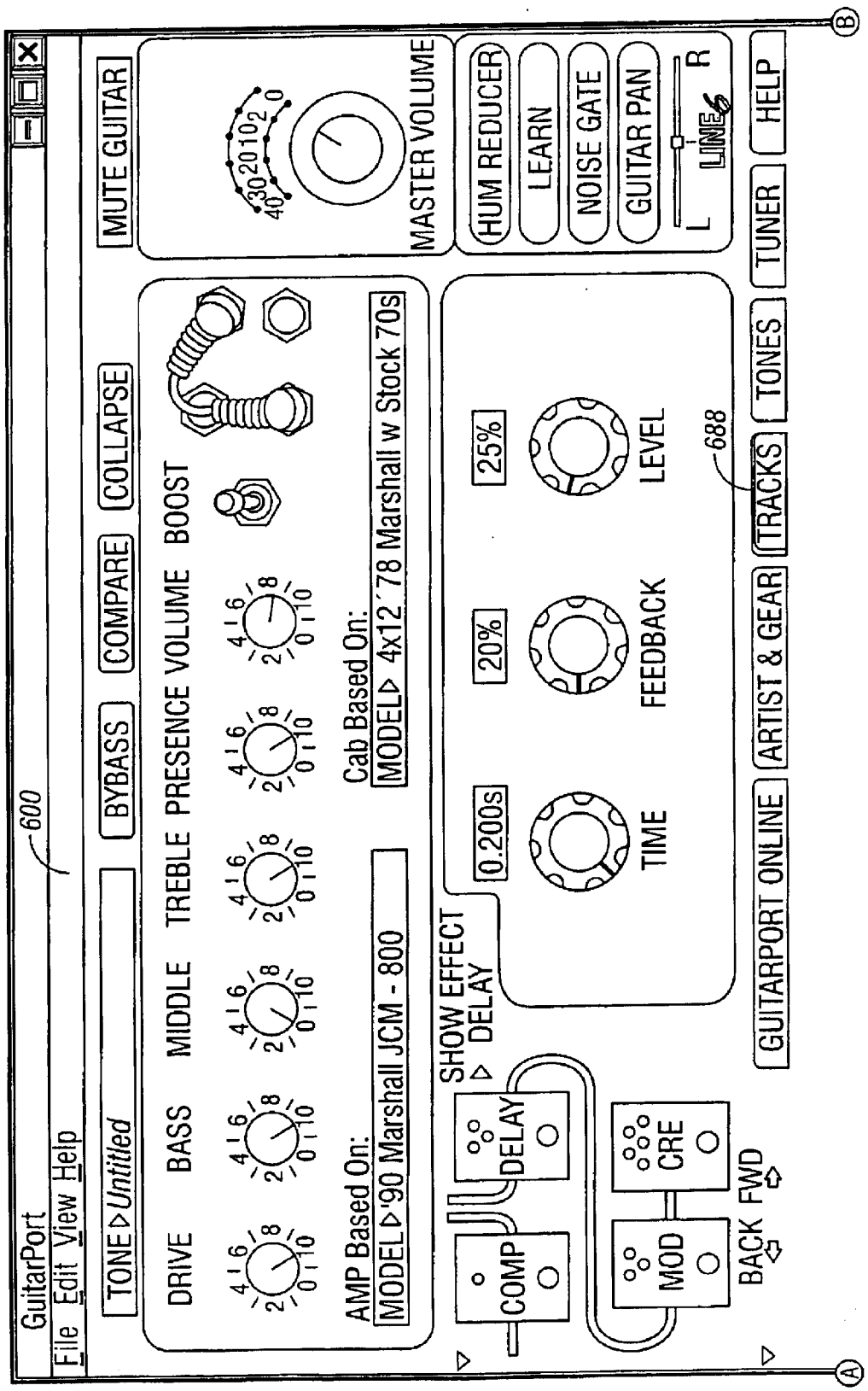
FIG. 6c is a screenshot showing the display illustrated to the user when the user has selected a musical piece (e.g. a Jamtrack), and particularly shows a multimedia presentation (e.g. with music notation) for the selected musical piece such that the user can play his or her guitar in conjunction with the multimedia presentation, according to one embodiment of the present invention.
Figures 2, 6C:
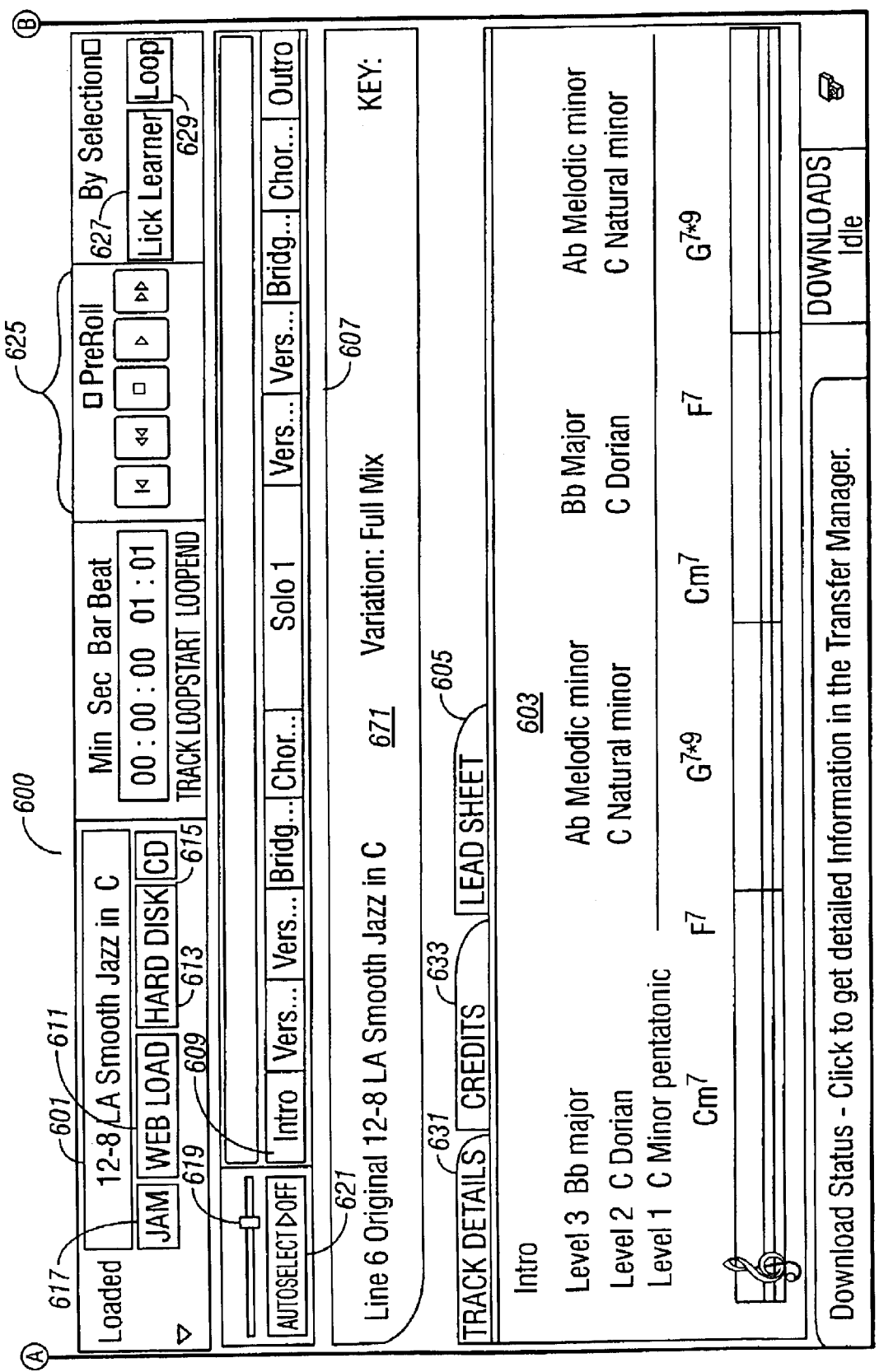

For example, turning briefly to FIG. 6c, the musical piece (e.g. Jamtrack) LA Smooth Jazz in C 601, and it's associated lead sheet 605 with musical notation 603 has been selected by user and is shown. Associated with the LA Smooth Jazz musical piece are MIDI markers. The text labels 609 for the MIDI markers 607 are displayed above the musical notation 603 and come from the MIDI file 546 of the session file 539. In this example, the text labels 609 of the MIDI markers 607 represent different portions of the musical piece/audio file 540, as shown: Intro, Verse, Bridge, Chorus, Solo 1, etc. For example, a MIDI marker 607 may have the text label 609 "Chorus". The MIDI marker 607 for the text label 609 "Chorus" causes the music notation 603 (e.g. chords, notes, guitar tablature, and lyrics, etc.) to be displayed whenever the chorus of the song begins. As another example, as shown in FIG. 6c, the music notation 603 for the Intro (e.g. chords) is shown. Thus, when the computing device 102 receives a MIDI marker 607 from associated session file 539, it processes the MIDI marker utilizing JavaScript, which looks up the corresponding function and executes the script for it. The JavaScript typically loads a picture or draws something on the display device. In this example, the JavaScript displays the musical notation 603 (e.g. chords) for the Intro of the selected musical piece, LA Smooth Jazz in C when it receives the MIDI marker 607 for the "Intro".

Returning to FIG. 5c, illustrating method 503, at block 528, the session file 539 (e.g. the audio file 540 and the rest of the multimedia data) is processed to present a multimedia presentation of an audio file 540 to the user (e.g. including musical notation 603). This allows the user to play a guitar 112 in conjunction with the multimedia presentation of the audio file 540 (block 530).

Referring also to FIG. 6c, the computing device 102 can display pictures, text, and graphics during playback (e.g. on the display device 204). For example, the computing device can display musical notation 603 such that while the musical piece/Jamtrack (e.g. including audio file 540) plays, the current position within the musical pieces is displayed, typically along with other information: such as the lyrics, the key signature, and guitar tablature (e.g. chords, notes, figuring diagrams, etc.), and a user is allowed to play his or her guitar 112 in conjunction with the multimedia presentation of the audio file 540.

For example, in the present example of FIG. 6c, the musical piece (e.g. Jamtrack) LA Smooth Jazz in C 601, and it's associated lead sheet 605 with musical notation 603, has been selected by user and is display on the GUITARPORT Display 671. In this example, the text labels 609 of the MIDI markers 607 are displayed and represent different portions of the musical piece/audio file 540, as shown: Intro, Verse, Bridge, Chorus, Solo 1, etc. As shown in FIG. 6c, the music notation 603 for the Intro (e.g. chords) is shown. In this example, the JavaScript displays the musical notation 603 (e.g. chords) for the Intro of the selected musical piece, LA Smooth Jazz in C when it receives the MIDI marker 607 for the "Intro".

Accordingly, the user can play his or her guitar 112 in conjunction with the musical notation 603 and the audio file 540. As the audio file 540 progresses, the musical notation 603 can be automatically updated (e.g. to next portion of the musical piece—Bridge, Chorus, solo, etc.) such that the user can read the musical notation and play along. Moreover, the user can choose versions of the musical piece/audio file 540 with and without a guitar track to enable learning and jamming. Further, as previously discussed, musical pieces/audio files can be chosen that have the vocals, drums, bass, etc., removed.

Further, a patch block 544 that includes patch information such that the guitar 112 has the proper tone or sound to go along with the associated musical piece/audio file 540. The patch information includes the type of amplifier, speaker cabinet, effect settings, etc., such that the guitar settings of the control panel interface 600 are set to go along with the selected musical piece/audio file and can even accommodate changes within the musical piece itself. This can be triggered by the MIDI markers, as previously discussed. The application software module 402 sets the control panel graphical interface 600 to the proper configuration to model the sound characteristics of the tone for the guitar for the particular musical piece or portion of the musical piece and the DSP software module 412 properly processes the guitar signal to emulate the proper tone such that the guitar sound goes along with the musical piece/audio file 540. As previously discussed, the user's guitar is electrically routed through the computing device 102, allowing the computing device 102 to control the sound of a guitar during playback so that the amplifier model, its settings and any effects can change dynamically as required throughout the musical piece/audio file 540. As shown in FIG. 6c, an amplifier model based on a '90 Marshall JCM-800 amplifier with a Delay setting is used to emulate a jazz sound to go along with the Intro. for the selected LA Smooth Jazz in C musical piece. Thus, matching patches for each portion of a musical piece/Jamtrack are automatically provided, for example to go from one tone during the Chorus and to another tone during the Solo.

Looking at FIG. 6c, particular aspects of the GUITARPORT Display 671 will be discussed to point out other particular features of the invention. As shown, the Tracks button 688 has been selected, and the musical piece LA Smooth Jazz in C 601 has been particularly selected by the user. Accordingly, the LA Smooth Jazz in C's 601 associated lead sheet 605 with musical notation 603 is further displayed on the GUITARPORT Display 671. Below the selected musical piece (e.g. Jamtrack) LA Smooth Jazz in C 601 are buttons that control the way musical pieces can be selected. The Web Load button 611 allows a user to select a musical piece from the GUITARPORT Web-site and load it onto the user's computing device 102 (e.g. store it in local memory). The Hard Disk button 613 allows a user to select a musical piece already stored locally at the computing device 102 (e.g. on the user's hard disk). The CD button 615 allows a user to select a musical piece from a CD in the CD drive of the user's computing device 102. When a song is selected on the CD, the GUITARPORT server 104 determines if it has an associated session file 539 for the song, and if so, if a user so chooses, provides the multimedia presentation of the song (e.g. patch file, musical notation, etc.) to the user.

The Jam button 617, when selected by the user, begins the multimedia presentation of a musical piece (e.g. Jamtrack), previously discussed, such that the user can jam along. The Mixer Slide 619 controls the volume of the musical piece. The Autoselect On/Off button 621 can be used to toggle between using the pre-defined patch settings for the control panel graphical interface 600 (i.e. the amplifier settings) automatically selected for the currently playing multimedia presentation (e.g. Autoselect On), as opposed to, the user setting the control panel graphical interface 600 settings (i.e. the amplifier settings) themselves to their own liking (e.g. Autoselect Off).

A typical timer display 623 for musical pieces (e.g. Jamtracks) and loops is provided along with conventional digital multimedia control features 625 (e.g. play, record, stop, rewind, fast forward, etc.). A Lick Learner button 627, when selected, slows down the tempo of the currently playing musical piece (e.g. Jamtrack), without altering the pitch, to facilitate learning. Also, a Loop button 629 is provided, that when selected, loops (i.e. plays repeatedly), a current portion of a musical piece/Jamtrack (e.g. Intro, Chorus, etc.) to facilitate learning that portion of the musical piece. Moreover, track details 631 can be selected which provides information about the musical piece. For example, when it was recorded, information about the artists, what type of guitars, amplifiers, and effects that were used. Also, credits 633 can be selected which provides information about where the musical piece came from, e.g. Sony, Arista, etc., or whether the musical piece was specifically created (and by who) for the GUITARPORT Web-site. For example, musical pieces (e.g. Jamtracks) can be custom-created to facilitate the learning of particular types of music—e.g. rock, blues, jazz, country, etc.—exclusively for the GUITARPORT Web-site.

Accordingly, the present invention allows a user to couple his or her guitar 112 into the computing device 102, via the interface device 106, such that he or she can download tones and musical pieces from the GUITARPORT Web-site. The interface device 106 along with a subscription is required to obtain the online subscription services (e.g. downloading the musical pieces and tones). The interface device 106 uniquely identifies the user and, in conjunction with the rest of system 100, is used to authorize the user, encrypt and decrypt audio files, and to track the purchases of assets, as will be discussed in more detail later. Moreover, in response to a user selecting a musical piece (e.g. Jamtrack), the server 104 transmits a session file 539 associated with the musical piece to the computing device 102 through the computer network 105. The session file 539 includes an audio file and multimedia data such that the computing device can process the session file to present the multimedia presentation of the audio file to the user. The computing device 102 processes the session file 539 to present the multimedia presentation of the audio file to the user (e.g. including scrolling music notation 603) such that a user can play his or her guitar 112 in conjunction with the multimedia presentation of the audio file. Furthermore, an intuitive control panel graphical interface 600 for the guitar resembling familiar guitar equipment is provided. The control panel graphical interface 600 includes an amplifier panel with standard controls, allowing the user to select from several different types of amplifiers to achieve different tones. Also, a set of effect boxes is also provided.

As previously described, users can listen to musical pieces while viewing musical notation 603 (e.g. chords, notes, tablature (fingering diagrams), lyrics, etc.). These musical pieces can include both commercial musical pieces and musical pieces created exclusively for use by the GUITARPORT Web-site to facilitate the learning of the guitar. Users can jam along with versions of a musical piece with and without the original guitar track to facilitate practice. Thus, users are provided quick and easy access to a wide variety of musical pieces (e.g. Jamtracks) that they can download from a server 104, and the user can then play along with the downloaded musical piece, which is presented in a multimedia presentation format to facilitate learning.

Users can be provided with access to hundreds or thousands of musical pieces (e.g. Jamtracks) in a range of different styles. Musical pieces may include the following: pre-existing sound recordings; remixes of pre-existing sound recordings (example without the guitar track or vocal tracks); re-recorded versions of previously published copyrighted songs; original songs produced for the GUITARPORT Web-site (e.g. songs created to facilitate the learning of guitar); drum loops; grooves, etc. Furthermore, grooves (e.g. rhythm sections, drumbeats, etc.) can be provided to facilitate jamming and practice. Moreover, the GUITARPORT Web-site can also provide for the sale of many other music related assets, besides musical pieces (e.g. Jamtracks), such as: CDs by a multitude of recording artists, printed sheet music, tablature, guitar notation, chord charts, lyrics, digital sheet music, T-shirts, music memorabilia etc. Additionally, as will be discussed in detail later, each unique musical piece or tone downloaded, or any type of purchase, is tracked and re-recorded for accurate reporting to content licensing partners (e.g. the copyright owner).

Embodiments of the present invention further provide a security device 110 to uniquely identify a user and to decrypt encrypted assets for use by the computing device 102. Thus, the security device protects against unauthorized duplication of licensed material and provides a secure revenue opportunity for content providers. Typically assets relate to musical pieces (e.g. Jamtracks) including audio files (e.g. copyrighted sound recordings), however, it should be appreciated that assets can be any sort of data (e.g. multimedia, video, movies, voice, software, generic data forms, etc.) transmitted over a computer network. As will be discussed in more detail later, the security device 110 in conjunction with the computing device 102 and the server 104, allow the server 104 to uniquely identify the security device 110 and allow a computing device 102 coupled to the authorized security device 110 to decrypt assets specifically encrypted for use by the authorized security device 110, along with many other functions. As will be discussed, the security device 110 includes an embedded electronic Serial No. and user key that is combined with hardware encryption and key storage circuitry, to uniquely identify each security device 110 to the server 104, and to ensure that assets will only operate with a computing device 102 coupled to an authorized security device thereby providing a secure revenue opportunity for content providers.

Figure 7A:
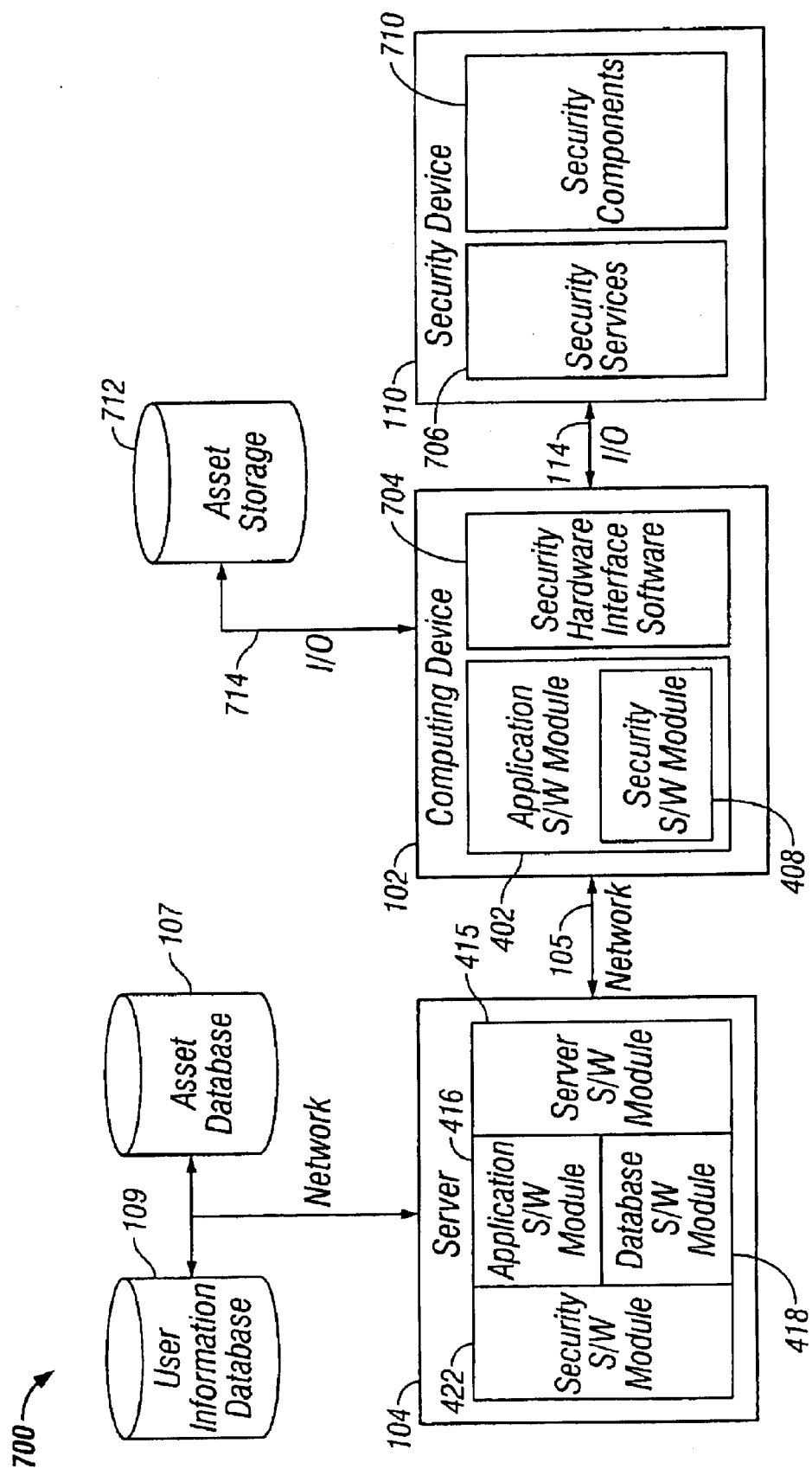
FIG. 7a illustrates a security system, according to one embodiment of the present invention.

Referring now to FIG. 7a, FIG. 7a illustrates a security system 700, according to one embodiment of the present invention. As previously discussed, the server 104 is coupled through the computer network 105 (e.g. the Internet) to the computing device 102, and the computing device 102 is in turn connected through an I/O link (e.g. a USB link) to a security device 110.

Shown to highlight the security aspects of the security system 700, the server 104 includes the security software module 422, the application software module 416, the server software module 415, the database software module 418 and, not shown here, the commerce software module 420. Moreover, coupled to the server 104 through computer network connections are the asset database 107 and the user information database 109.

Further shown to highlight the security aspects of the security system 700, the computing device 102 includes the application software module 402 including the security software module 408 and security hardware interface software 704. The security device 110 includes security services 706 and security components 710 to implement the security services 706. Moreover, local asset storage 712, for example local memory such as a hard drive is coupled through I/O link 714 to the computing device 102 or is part of the computing device 102. Local asset storage 712 can be used to store assets (e.g. audio files) previously downloaded by the user.

The security device 110 includes security components 710 that can be utilized to implement security services 706. Such security services 706 include uniquely identifying the security device 110 to the server 104 such that access to the server 104 is only granted to a user operating with an authorized security device 110. Another security service 706, performed by the security device 110 in conjunction with the server 104, is to ensure that assets (e.g. audio files) are properly encrypted and decrypted such that only a computing device 102 coupled to properly authorized security device 110 can receive and utilize assets.

Looking particularly at the server 104, the server 104 includes the security software module 422 that contains security programs and algorithms for performing security functions, as will be discussed. The security software module 422 coordinates information from a clock/calendar of the server 104 and the various databases—i.e., the user information database 109 and the asset database 107, to authenticate users and deliver encrypted assets to authenticated users. The clock/calendar is a typical part of a server computer 104 that allows it to accurately determine the date and time. Further, the server 104 operates in secure operating environment (e.g. utilizing Secure Sockets Layer (SSL), S-HTTP, etc).

The user information database 109 includes subscription and registration information for each user who is registered to access the server 104 (e.g. in one embodiment, a GUITARPORT Web-site subscriber) and who also has an authorized security device 110. The subscription information for each user includes the expiration date for the user's subscription and the user's unique serial number for his or her security device 110, user key, and memory key, which are needed for determining the authenticity of each security device 110 and for encrypting and decrypting assets, as will be discussed.

The asset database 107 contains assets (e.g. multimedia presentations associated with musical pieces and audio files as previously discussed Jamtracks including full songs and songs with various instrumental tracks removed), as well as any other sort of digital data asset. Moreover the asset database 107 includes unique asset encryption keys for each asset (e.g. each audio file). Further, it should be appreciated that the asset database 107 can include any other assets that can be purchased or rented and downloaded to a computing device 102 over a computer network 105.

Looking particularly at the computing device 102, the computing device 102 particularly includes the application software module 402 and the security software module 408. The security software module 408 includes standard encryption and decryption routines to encrypt and decrypt assets, as will be discussed. Any suitable block mode cipher that utilizes pseudo-random generators to XOR pseudo-random numbers with data can be used. Some examples include Data Encryption Standard (DES), International Date Encryption Algorithm (IDEA), etc. Further, the security software module 408, as will be discussed later, allows the computing device 102 to be used as a conduit for interaction between the server 104 and the security device 110 and to particularly authenticate the service device 110. However, the application software module 402 and the security software module 408 are not assumed to execute in a secure operating environment.

The security hardware interface software 704 provides a standard input/output interface (e.g. a USB interface) between the computing device 102 and the security device 110. Furthermore, the computing device uses a standard clock/calendar (i.e. common to most all computing devices) that allows the application software module 402 to accurately determine the date and time for interactions between the computing device 102 and the security device 110.

Figure 7B:
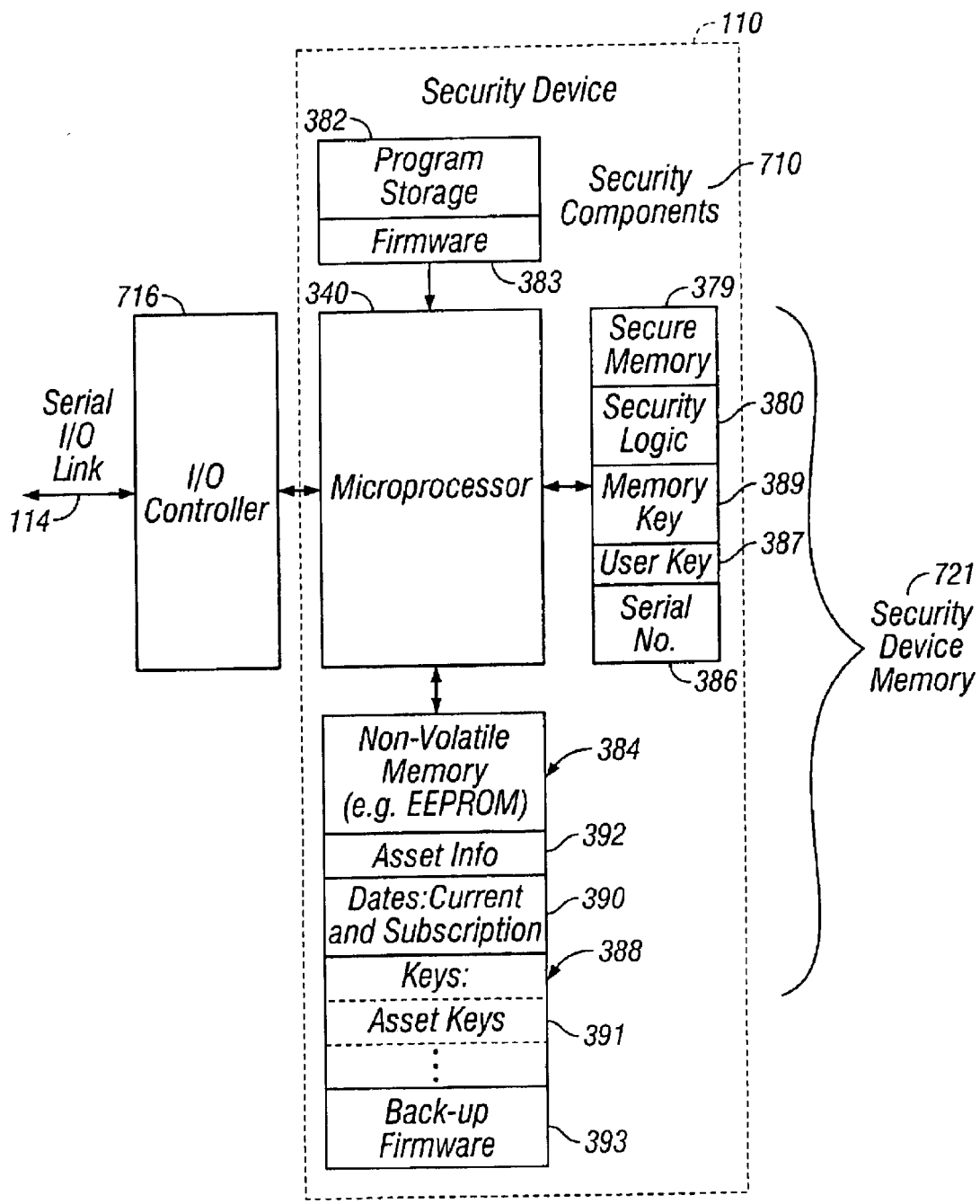
FIG. 7b illustrates the pertinent security components of the security device used in the security system, according to one embodiment of the present invention.

Looking particularly at the security device 110 and referring now to FIG. 7b, FIG. 7b illustrates the pertinent security components 710 of the security device 110 according to one embodiment of the present invention. As shown in FIG. 7b, the security device 110 includes a microprocessor 340, a secure memory 379 having security logic 380, program storage 382 to store security firmware 383, and nonvolatile memory 384 (e.g. EEPROM). Also, an I/O controller 716 controls the flow of digital data to and from the computing device 102 along serial I/O link 114. In one example, the serial I/O controller 716 can be a USB controller and the serial I/O link 114 can be a USB link. The digital data controlled by the serial I/O controller 716 can include keys, asset information and other data, as will be discussed.

Generally, the security firmware 383 when executed by the microprocessor 340 in conjunction with the secure memory 379 and the nonvolatile memory 384, provide for secure operations that allow the server 104 to uniquely identify the security device 110 and allow the computing device 102 in conjunction with the security device 110 to decrypt assets specifically encrypted for use by a computing device 102 coupled to the authorized computing device 102. The secure memory 379 includes both read-only memory (ROM) and writeable memory, which can be locked and unlocked for reading and writing using the hardware implemented security logic 380.

A user key 387 associated with serial number 386 of the security device 110 is used by the security logic 380 to authenticate the security device 110 to the server 104. Also, a memory key 389 is used by the security logic 380 to initially unlock the secure memory 379. The serial number 386, user key 387, and memory key 389 are sealed in the secure memory 379 during manufacturing and thereafter can no longer be written over once the secure memory 379 is sealed. The serial number 386, user key 387, and memory key 389 are also stored at the server's user information database 109 so that the server 104 can initially generate a challenge and response to uniquely authenticate the security device 110 and open and lock the secure memory 379 and the nonvolatile memory 384, as will be discussed in more detail later.

The nonvolatile memory 384 is used as an extension to the secure memory 379. The firmware 383 prevents access to the nonvolatile memory 384 unless the secure memory 379 has also been unlocked. The nonvolatile memory 384 has hardware write protection, which is controlled by the firmware 383. The nonvolatile memory 384 stores keys 388 such as asset encryption keys (e.g. audio file keys) associated with particular purchased assets (e.g. audio files), the current date and subscription dates for certain assets 390, and asset information (e.g. information about assets) 392. It should be appreciated that the serial number 386, the user key 387, the memory key 389, keys 388, the dates 390, the asset information 392 and even the firmware 383 can instead be located or co-located at any of the security device memories: program storage 382, secure memory 379, or nonvolatile memory 384; this particular arrangement being only one embodiment.

Moreover, as will be discussed, the security software of the server 104, computing device 102, and the firmware of the security device 110, include standard encryption and decryption routines to encrypt and decrypt assets, keys, dates and other data sent between these devices. Any suitable block mode cipher that utilizes pseudo-random generators to XOR pseudo-random numbers with data can be used. Some examples include Data Encryption Standard (DES), International Date Encryption Algorithm (IDEA), etc.

Various security functions implemented by the combination of the server 104, computing device 102, and security device 110, will now be discussed with reference to the flowcharts of FIGS. 8a–8i.

One of the security functions to be performed is that the server 104 uniquely identifies a security device 110 to ensure that the computing device 102 coupled to security device 110 is authorized to access the server 104 and its many functions (e.g. in one embodiment, the GUITARPORT Website). Further, the server 104 determines the authenticity of the security device 110 to prevent unauthorized access to the server 104 and its assets (e.g. audio files). This is done when a user initially tries to log on to the server 104 and can be performed periodically thereafter. This authentication process includes the server 104 issuing a coded challenge to the security device via a scripting language performed by the security software module 422 of the server 104. The firmware 383 of the security device 110 executes a program to generate a response. An authorized security device 110 will return a unique response, which the server 104 utilizing the security software module 422 will validate. If the response is valid for the specific security device 110, the session is continued. If the response is not valid, the session is terminated.

Figure 8A:
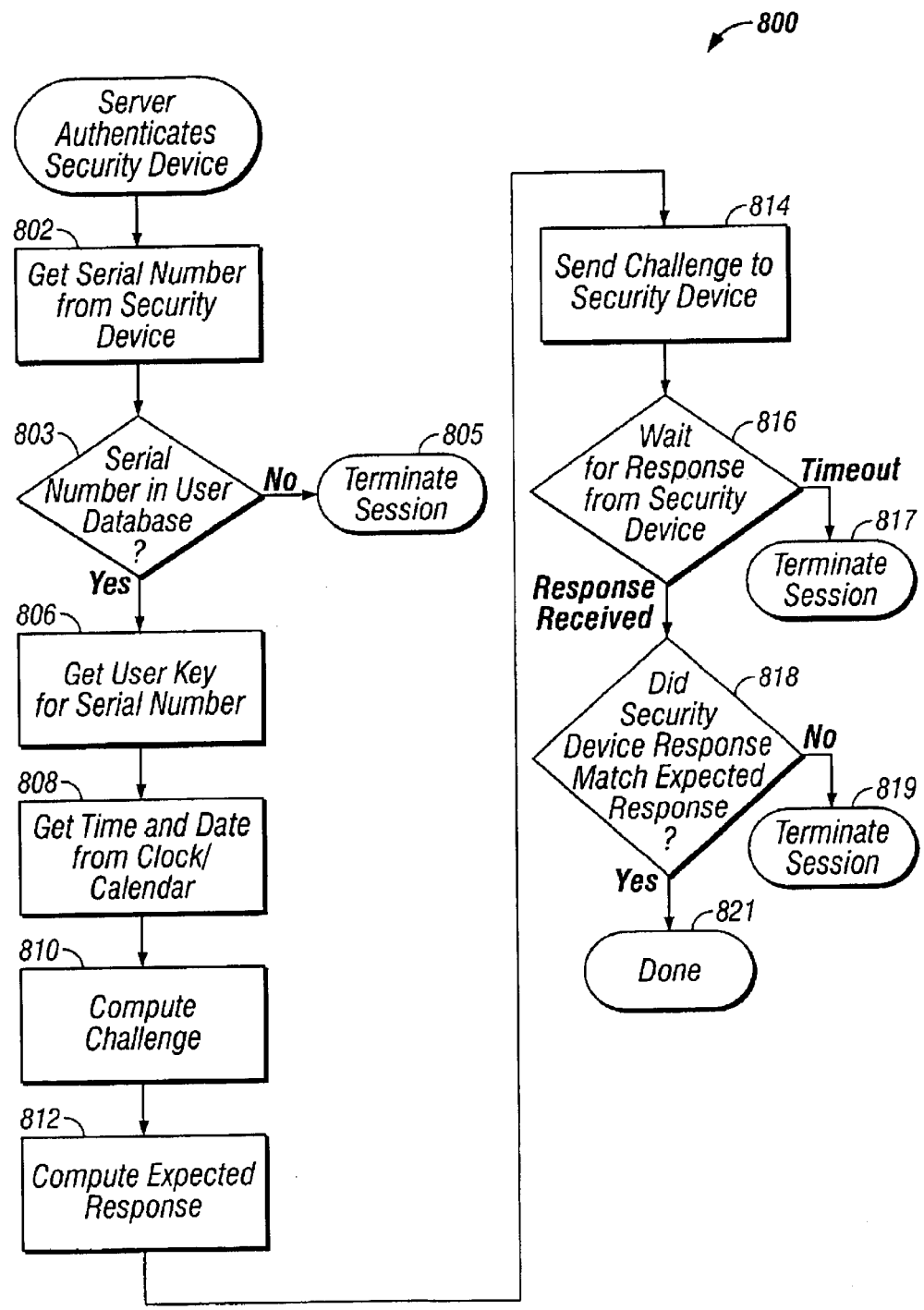
FIG. 8a is a flow diagram illustrating a process for the server to authenticate the security device, according to one embodiment of the present invention.

Turning to FIG. 8a, FIG. 8a is a flow diagram illustrating a process 800 for the server 104 to authenticate the security device 110, according to one embodiment of the present invention. These process steps 800 are generally implemented by the security software module 422 of the server 104 in conjunction with the other software modules at the server. First, the server 104 requests the Serial No. 386 stored in the secure memory 379 of the security device 110 from the security device 110 (block 802). In response to the received Serial No., at block 803, the server determines whether the Serial No. is in the user information database 109. If not, the session is terminated (block 805). However, if the Serial No. is in the user information database 109, then the server 104 obtains the user key for the Serial No. from the user information database 109 (block 806). As previously discussed, the user information database 109 stores a unique user key for each Serial No. associated with each security device 110. The server 104 also obtains a time and date from the clock/calendar of the server 104, which will be used later to see if the subscription is expired (block 808).

Next, the server 104 computes a challenge (block 810) and the expected response from the security device 110 (block 812). The challenge is basically a request for the security device 110 to accurately identify itself by sending an appropriate response. The challenge is created at the server 104 by performing a mathematical transformation on the user key 387 associated with the security device 110. Both the server 104 and the security device 110 utilize the same mathematical transformation and have the same user key 387 such that the response generated at the security device 110 should be the same as the response created at the server 104 (assuming it actually is the security device associated with the serial number for the user). In one embodiment, the common mathematical transformation of the server 104 and security device 110 can be any suitable one-way hashing function.

The challenge is then sent from the server 104 to the security device 110 (block 814). The server 104 then waits for the response from the security device 110 (block 816). If a predefined period of time passes, the process 800 is timed out, and the session is terminated (block 817). However, if a response is received within the predefined period of time, the server 104 determines whether the response from the security device 110 matches the expected response (block 818). If not, the session is terminated (block 819). If so, the user is allowed to log on to the server 104 and the process 800 is complete (block 821). For example, the use can access the GUITARPORT Web-site, previously discussed.

Figure 8B:
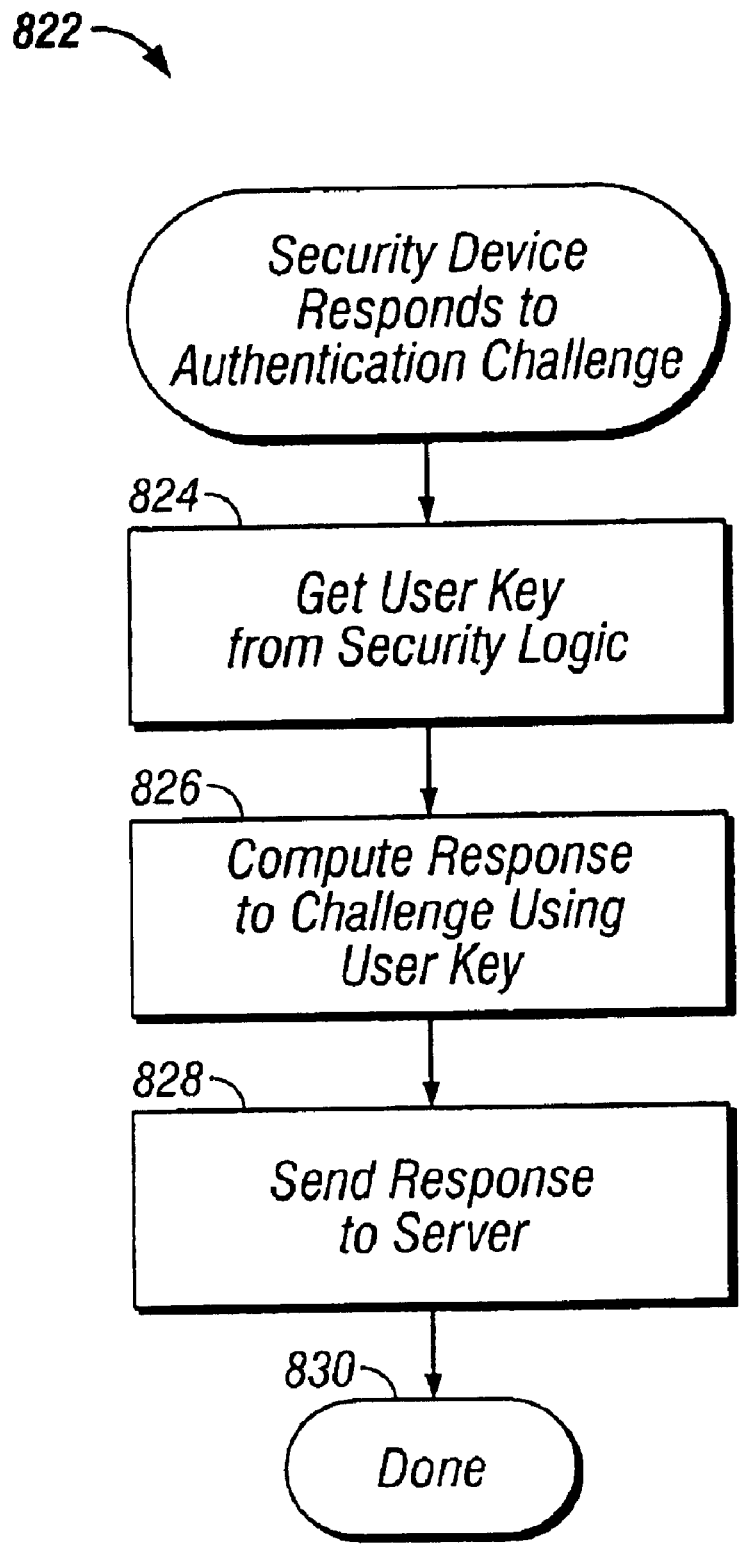
FIG. 8b is a flow diagram illustrating a process for the security device to respond to an authentication challenge from the server, according to one embodiment of the present invention.

Referring now to FIG. 8b, FIG. 8b is a flow diagram illustrating a process 822 for the security device 110 to respond to the authentication challenge from the server 104, according to one embodiment of the present invention. These process steps 822 are generally implemented under the control of the firmware 383 of the security device 110. First, the user key 389 is obtained from the secure memory 379 (block 824). Next, at block 826, the response to the challenge is computed. As previously described, the response is typically a mathematical transformation (e.g. a one-way hashing function), common to both the server 104 and security device 110, of the user key 389 (again, common to both the server 104 and security device 110). The response to the challenge is then sent to the server 104 (block 828). The process 822 is then complete (block 830).

Other security functions implemented by the combination of the server 104, computing device 102, and security device 110, relate to updating the current date and the subscription expiration date stored at the security device 110. The current date and the subscription expiration date 390 are stored in nonvolatile memory 384 of the security device 110. The server 104 updates both the subscription expiration date and the current date 390 in the security device 110. However, the application software module 402 of the computing device 102 also updates the current date 390 when the server 104 is not connected. Because the application software module 402 is not considered secure, the server 104 updates the subscription expiration date and the current date 390, when it is connected, to maintain security.

Figure 8C:
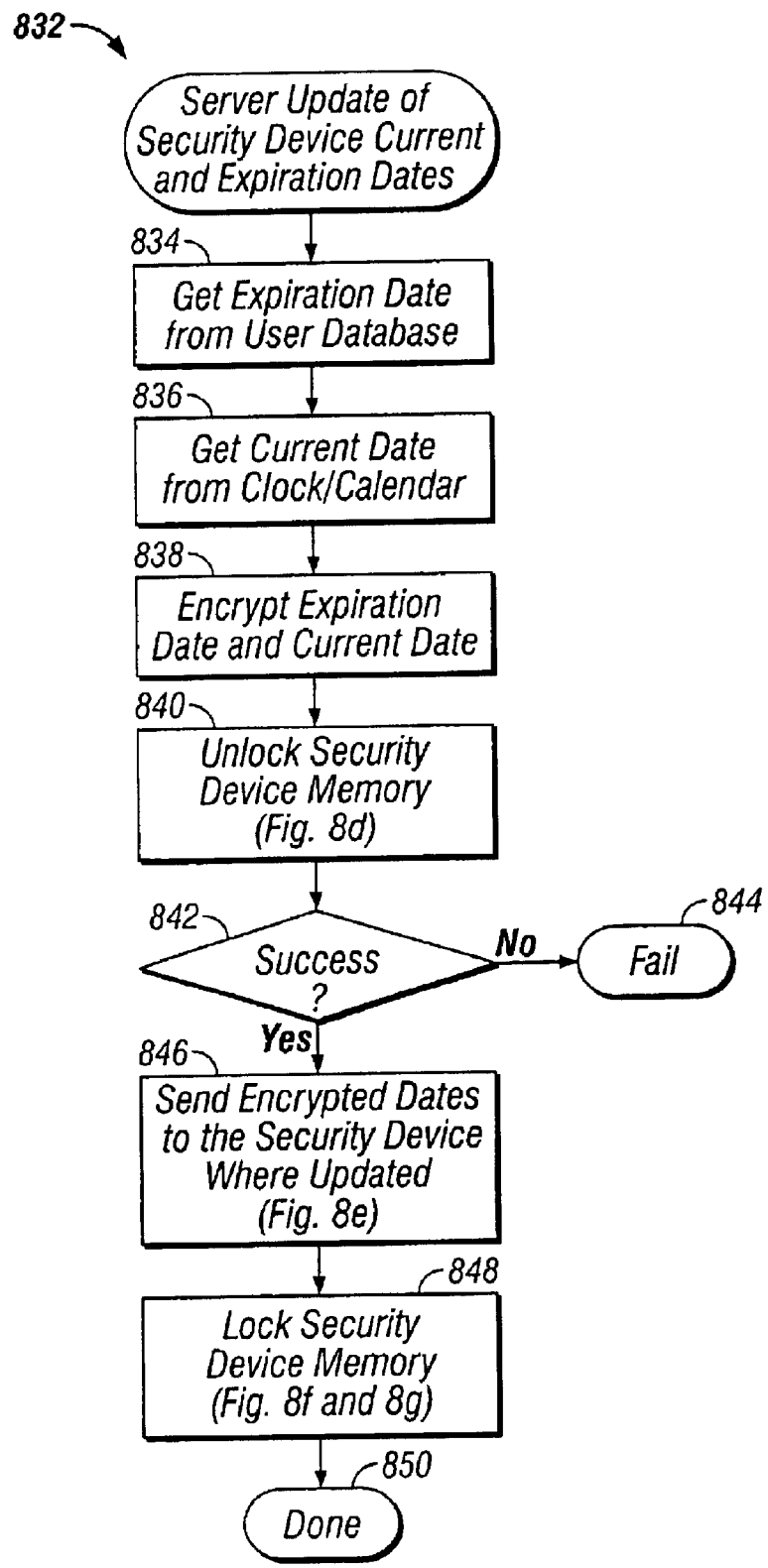
FIG. 8c is a flow diagram illustrating a process for the server to update the security device with the current date and the subscription expiration date, according to one embodiment of the present invention.
Figure 8D:
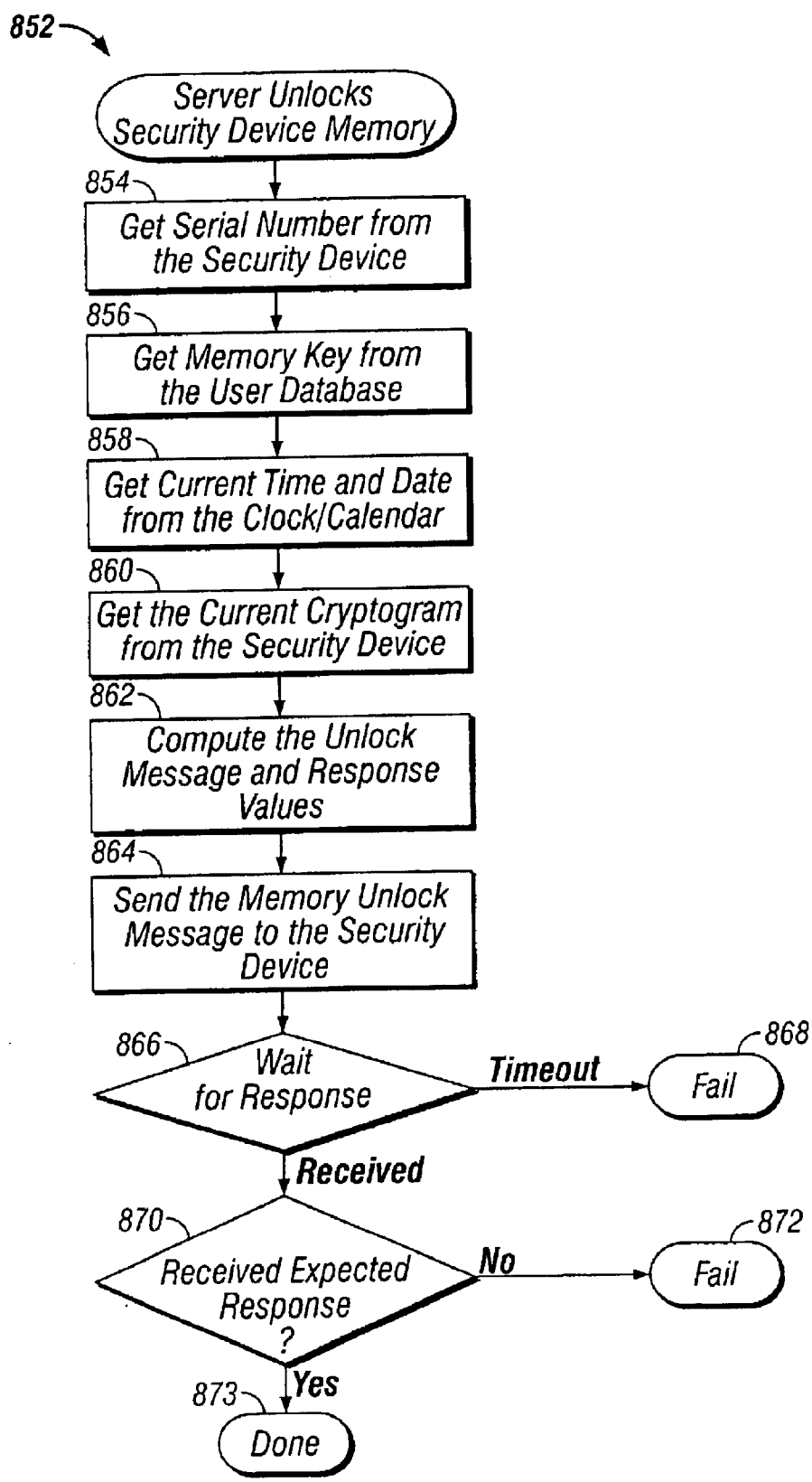
FIG. 8d is a flow diagram illustrating a process for the server to unlock the security device memory of the security device, according to one embodiment of the present invention.

Turning to FIG. 8c, FIG. 8c is a flow diagram illustrating a process 832 for the server 104 to update the security device 110 with the current date and the subscription expiration date, according to one embodiment of the present invention. These process steps 832 are generally implemented by the security software module 422 of the server 104 in conjunction with the other software modules at the server 104. First, the subscription expiration date from the user information database 109 is obtained for the user (block 834). Next, the current date from the clock/calendar of the server 104 is obtained (block 836). The subscription expiration date and the current date are then encrypted (block 838). Further, the server 104 sends a command to the security device 110 to unlock the security device memory 721 including the nonvolatile memory 384 (block 840). FIG. 8d, as will be discussed, describes the process of unlocking the security device memory 721. Based on a response from the security device 110 as to whether the security device memory 721 has been successfully unlocked, the server 104 determines whether the unlock operation was successful or not (block 842). If the security device memory 721 was not successfully unlocked, the process 832 fails (block 844).

Figure 8E:
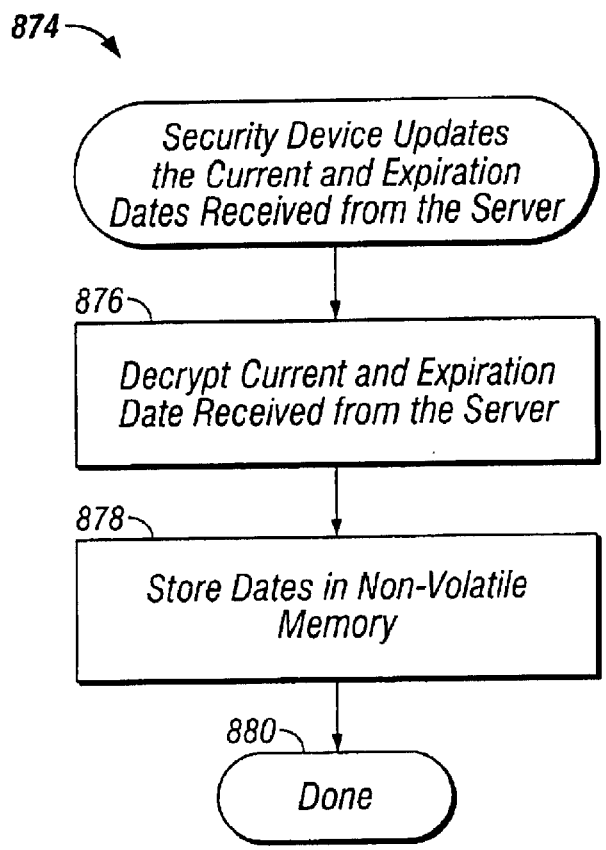
FIG. 8e is a flow diagram illustrating a process for the security device to update the current and subscription expiration dates received from the server, according to one embodiment of the present invention.
Figure 8F:
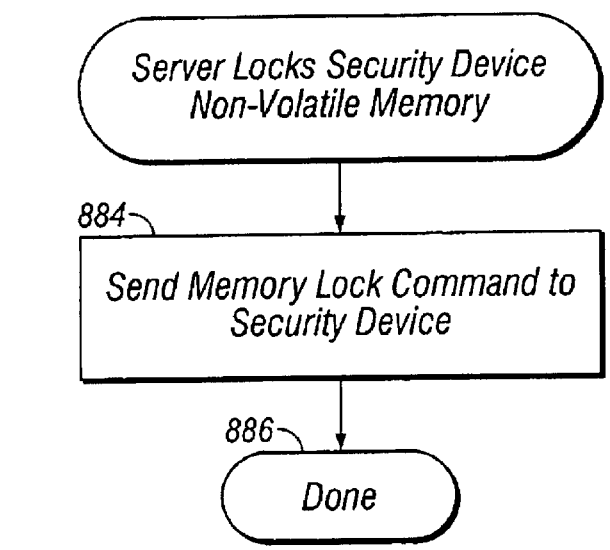
FIG. 8f is a flow diagram illustrating a process for the server to lock the nonvolatile memory of the security device memory of the security device, according to one embodiment of the present invention.
Figure 8G:
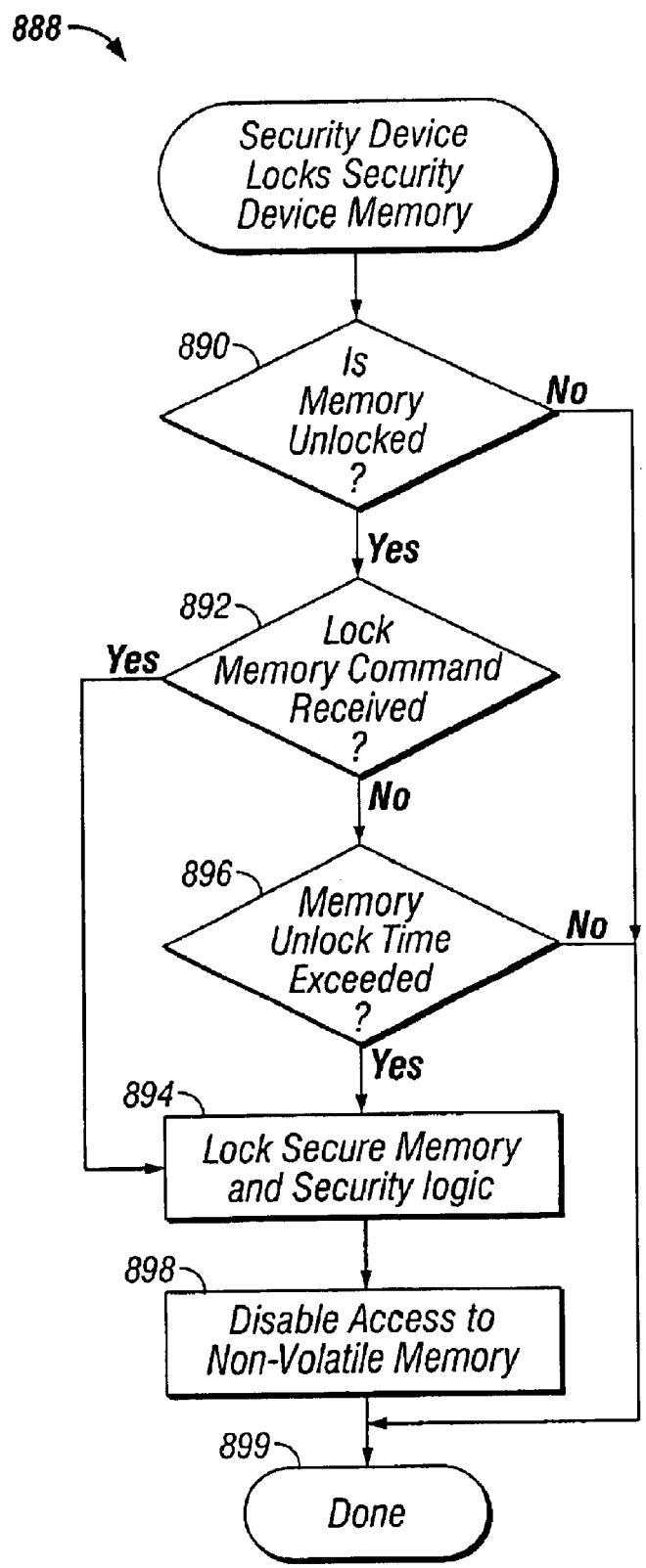
FIG. 8g is a flow diagram illustrating a process for the security device to lock the security device memory, according to one embodiment of the present invention.

However, if the security device memory 721 was successfully unlocked, then the server 104 sends the encrypted subscription expiration date and the current date to the security device 110 where the security device 110 updates the dates (block 846). FIG. 8e, as will be discussed, describes the process of the security device 110 updating the dates. The server then sends a command to the security device to lock the security device memory 721 (block 848). FIGS. 8f and 8g, as will be discussed, describe the process of locking the security device memory 721. The process 832 is then complete (block 850).

Referring to FIG. 8d, FIG. 8d is a flow diagram illustrating a process 852 for the server 104 to unlock the security device memory 721 of the security device 110, according to one embodiment of the present invention. At block 854 the server 104 obtains the Serial No. 386 from the security device 110. Next, at block 856 the server obtains the memory key 389 associated with the Serial No. for the user from the user information database 109. The server 104 then obtains the current time and date from the clock/calendar of the server 104 (block 858). The server then obtains the current cryptogram from the security device 110 (block 860). The current cryptogram is a random number generated by the security device 110 each time the security device 110 is authenticated by the server 104.

The server 104 next computes an unlock message to unlock the security device memory 721 and an appropriate expected response value from the security device 110 (block 862). Then, the server 104 sends the memory unlock message to the security device 110 (block 864).

If the unlock message is valid, i.e. decipherable by the security device 110 to properly command the security device 110 to unlock its security device memory 371 (such that both the security device and the server must be authorized participants), the security device 110 will send the expected response back to the server 104. The server 104 requires an appropriate expected response back from the security device 110 to verify that it is the authorized security device 110 and that the security device memory 371 has therefore been unlocked. Conversely, the security device 110, based on the unlock message, can verify that the server 104 is authorized to command the security device to unlock its security device memory 371. The symmetrical expected response generated at the server 104 and the response generated at the security device 110, utilizing the memory key 389 and the cryptogram, in one embodiment, can be based upon a proprietary anti-wire tapping algorithm created and licensed by the ELVA Corporation. However, any suitable zero-knowledge proof algorithm for accurately authenticating two parties can be used. Furthermore, in one embodiment, the security logic 380 that implements the ELVA anti-wire tapping algorithm may be a cryptography device produced by the ATMEL Corporation.

Continuing with the present example, the server 104 waits for an appropriate response from the security device 110 for a predefined period of time (block 866). If the security device 110 does not respond with a predefined period of time then the process 852 fails (block 868). If the server 104 receives a response from the security device 110 in time, then at block 870, the server 104 determines whether it has received the expected response from the security device 110. If not, the process 852 fails (block 872). If the server 104 receives the expected response from the security device 110, then the server 104 knows that the security device memory 721 of the security device 110 has been unlocked. Accordingly, as will be discussed with reference to FIG. 8e, the memory is unlocked such that the security device can update the current and subscription expiration dates received from the server 104. The process 852 is then complete (block 873). Moreover, it should be appreciated that the security device memory 721 can be unlocked to perform many other functions, for example, to store asset information 392, asset keys 391, etc., as will be discussed.

Referring to FIG. 8e, FIG. 8e is a flow diagram illustrating a process 874 for the security device 110 to update the current and subscription expiration dates received from the server 104, according to one embodiment of the present invention. Again, the security device operates under the control of the firmware 383 to implement its functions. At block 876 the security device 110 decrypts the current date and the subscription expiration date received from the server 104. Next, at block 878, the security device 110 stores the current date and the subscription expiration date 390 in nonvolatile memory 384. The process 874 is then complete (block 880).

Referring to FIG. 8f, FIG. 8f is a flow diagram illustrating a process 882 for the server 104 to lock the nonvolatile memory 384 of the security device memory 721 of the security device 110, according to one embodiment of the present invention. In order to accomplish this, the server 104 merely sends a memory lock command to the security device 110 (block 884). The process 882 is then complete (block 886).

After the server 104 sends a memory lock command to lock the nonvolatile memory 384, the security device 110 can lock the secure memory 379. Turning now to FIG. 8g, FIG. 8g is a flow diagram illustrating a process 888 for the security device 110 to lock the secure memory 379, according to one embodiment of the present invention. At block 890, the security device 110 determines whether the secure memory 379 is unlocked. If not, indicating that the secure memory 379 is already locked, the process 888 is complete (block 899). If the secure memory 379 is unlocked, the security device 110 checks to see whether the lock memory command has already been received (block 892). If so, the security device 110 locks the secure memory 379 and the security logic 380 (block 894) and disables access to the nonvolatile memory 384 (block 898). The process 888 is then complete (block 899).

However, if the lock memory command has not been received at block 892 then the security device 110 checks to see whether the memory unlock time has been exceeded. If not, the process 888 is complete and the security device 110 can lock the security device memory 721 later (block 899). On the other hand, if the memory unlock time has been exceeded, then the security device 110 locks the secure memory 379 and the security logic 380 (block 894) and disables access to the nonvolatile memory 384 (block 898) such that the process 888 is then complete (block 899). Accordingly, once the secure memory 379 is locked, as well as, the nonvolatile memory 384, the whole security device memory 721 is locked. Thus, after the security device memory 721 has been unlocked to update the current and subscription expiration dates, to store asset information 392, asset keys 391, etc., it can be locked again.

As previously discussed, the application software module 402 and the security software module 408 of the computing device 102 can be used to update the current date and time in the security device 110. However, this is not secure, and these dates and times are always scrutinized against the dates and times received from the server 104 as previously discussed.

Figure 8H:
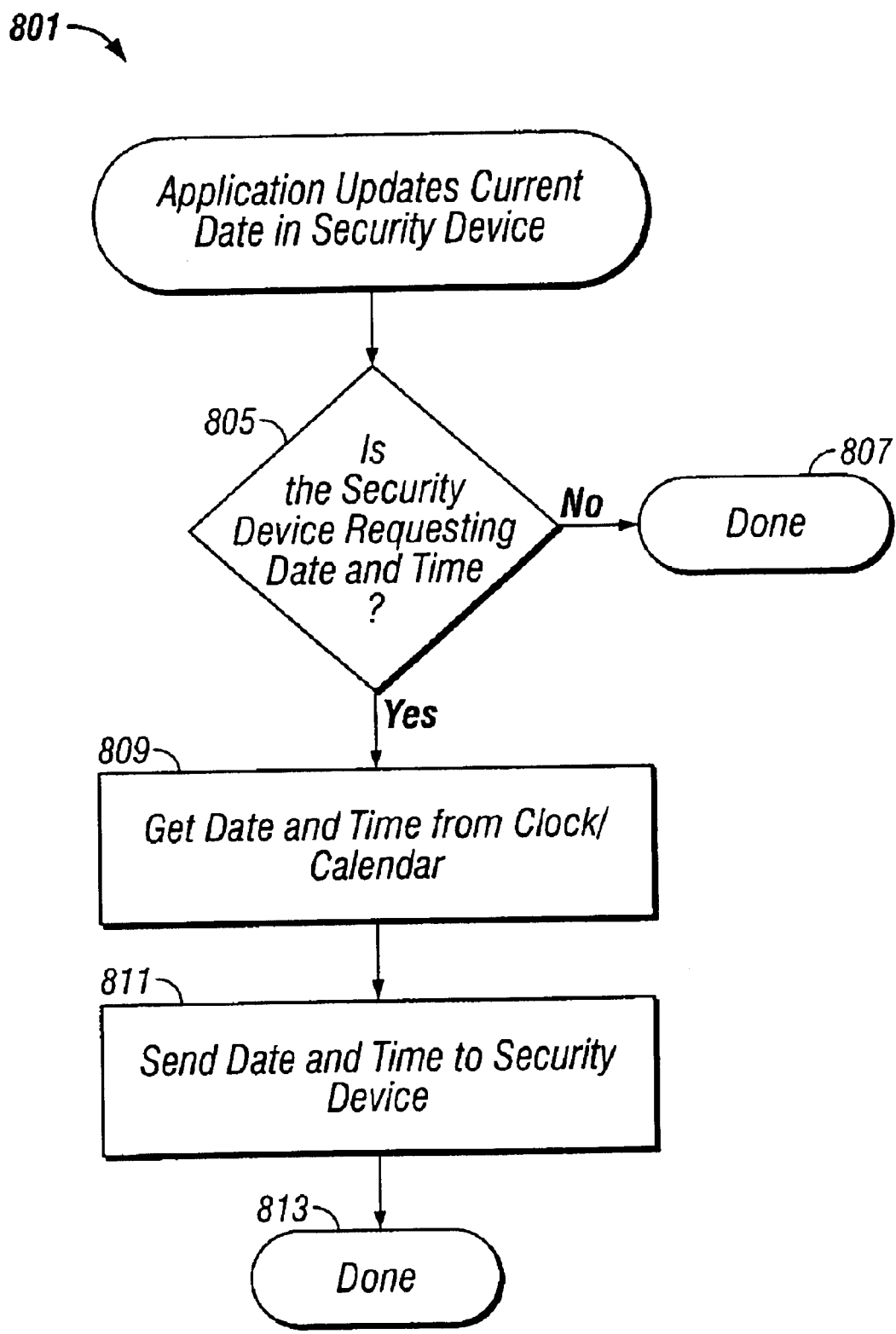
FIG. 8h is a flow diagram illustrating a process for the computing device to update the current date at the security device, according to one embodiment of the present invention.

Referring now to FIG. 8h, FIG. 8 is a flow diagram illustrating a process 801 for the application software module 402 of the computing device 102, in conjunction with the other software modules, to update the current date at the security device 110, according to one embodiment of the present invention. At block 805 the computing device 102 determines whether the security device 110 is requesting the date and time. If not, the process 801 is complete (block 807). However, if the security device 110 is requesting the date and time, then the computing device 102 obtains the date and time from the clock/calendar of the computing device 102 (block 809). The computing device 102 then sends the date and time to the security device 110 (block 811). The process 801 is then complete (block 813).

Figure 8I:
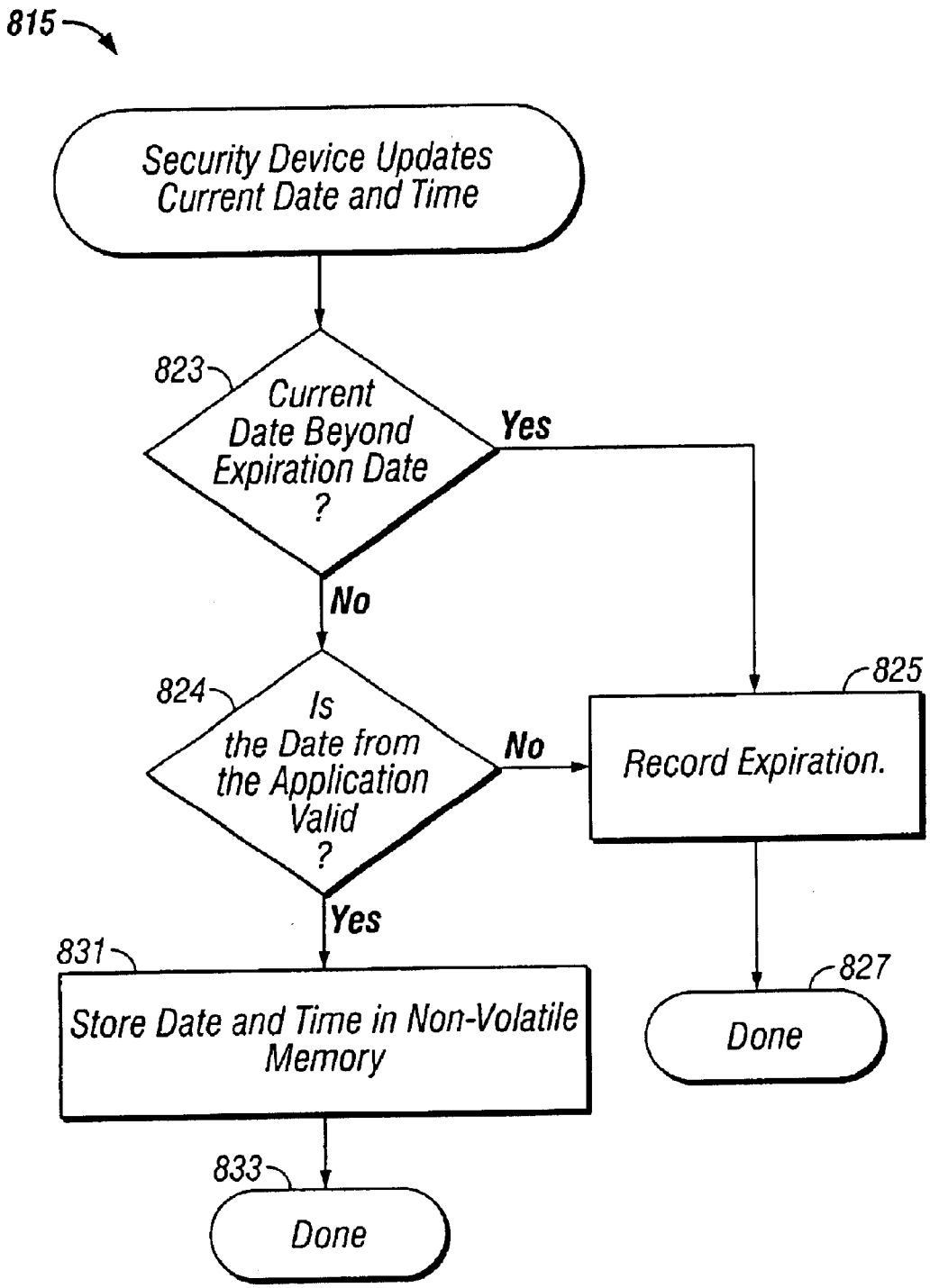
FIG. 8i is a flow diagram illustrating a process for the security device to update the current date and time received from the computing device, according to one embodiment of the present invention.

Turning now to FIG. 8i, FIG. 8i is a flow diagram illustrating a process 815 for the security device 110 to update the current date and time received from the computing device 102, according to one embodiment of the present invention. At block 823, the security device 110 determines whether the current date received is beyond the subscription expiration date. If so, the security device 110 records the expiration of the subscription (e.g. in nonvolatile memory 384) (block 825). The process 815 is then complete (block 827). The security device 110 may then instruct the computing device 102 to display to the user that his or subscription has expired and the server 104 will direct the user to update the subscription upon the next connection.

On the other hand, if the current date is not beyond the subscription expiration date, the security device 110 will check to see that the date received from the application software module 402 of the computing device 102 is valid as compared to the trusted date and time received from the server 104 from the last update (block 829). If not, the security device 110 will then assume there has been a breach of security and will record the expiration of the subscription (block 825). The process 815 is then complete (block 827). Again, the security device 110 may then instruct the computing device 102 to display to the user that his or subscription has expired and the server 104 will direct the user to update the subscription upon the next connection. However, if the date from the application software module 402 of the computing device 102 is determined to be valid by the security device 110 then the security device will then store the date and time 390 in the nonvolatile memory 384 (block 831). The process 815 is then complete (block 833).

Another security service 706, performed by the security device 110 in conjunction with the server 104, is to ensure that digital assets (e.g. audio files) are properly encrypted and decrypted such that only a computing device 102 coupled to properly authorized security device 110 can receive and utilize the assets. As previously discussed, the asset database 107 contains assets (e.g. multimedia presentations associated with musical pieces, audio files (e.g., as previously discussed Jamtracks including full songs and songs with various instrumental tracks removed), as well as other digital data assets. Moreover the asset database 107 includes unique asset encryption keys for each asset (e.g. for each audio file). Further, it should be appreciated that the asset database 107 can include any other type of digital data asset (e.g. multimedia data, video data, voice data, software, other generic forms of data, etc.) that can be purchased or rented and downloaded to a computing device 102 coupled to an authorized security device 110 over a computer network 105. Thus, the term "asset" as it will be used hereinafter specifically includes audio files (e.g. such as the Jamtracks previously discussed with reference to the GUITARPORT Web-site) but further includes any other sort of digital asset.

Embodiment of the present invention further provides a secure asset delivery system. Assets are encrypted by the security system 700 (referring also to FIG. 7a again) to protect against unauthorized duplication of licensed material. Each asset is stored in the asset database 107 of the server 104 and is encrypted with a different, unique asset key particularly for that asset. Each asset is uniquely encrypted utilizing the security software module 422 of the server 104, in conjunction with the other software modules. As each encrypted asset is streamed to the requesting computing device 102, the encrypted asset is stored in the asset storage 712 of the computing device 102. Further, the asset key for the asset is encrypted using the user key of the associated security device 100 of the requesting computing device 102, and the encrypted asset key is also streamed to the requesting computing device 102, where it is stored in the asset storage 712 of the computing device 102. As previously discussed each user key 389 is unique to each user's security device 110 and each user key 389 is stored at both the security device 110 and at the user information database 109 at the server 104.

When it is time to access the asset at the computing device 102, for example, the user wants to play a downloaded audio file asset (e.g. as part of a multimedia presentation for a Jamtrack to facilitate learning of the guitar), the security software module 408 in conjunction with the application software module 402 and the other software modules of the computing device 102, sends the encrypted asset key to the security device 110 to be decrypted. The decrypted asset key is then sent back from the security device 110 to the computing device 110 where it is used by the computing device 102, operating again with the security software module 408 in conjunction with the application software module 402 and the other software modules, to decrypt the asset (e.g. an audio file) into memory. The decrypted asset can then be utilized. For example, a decrypted audio file can be decompressed for playback.

Figure 9:
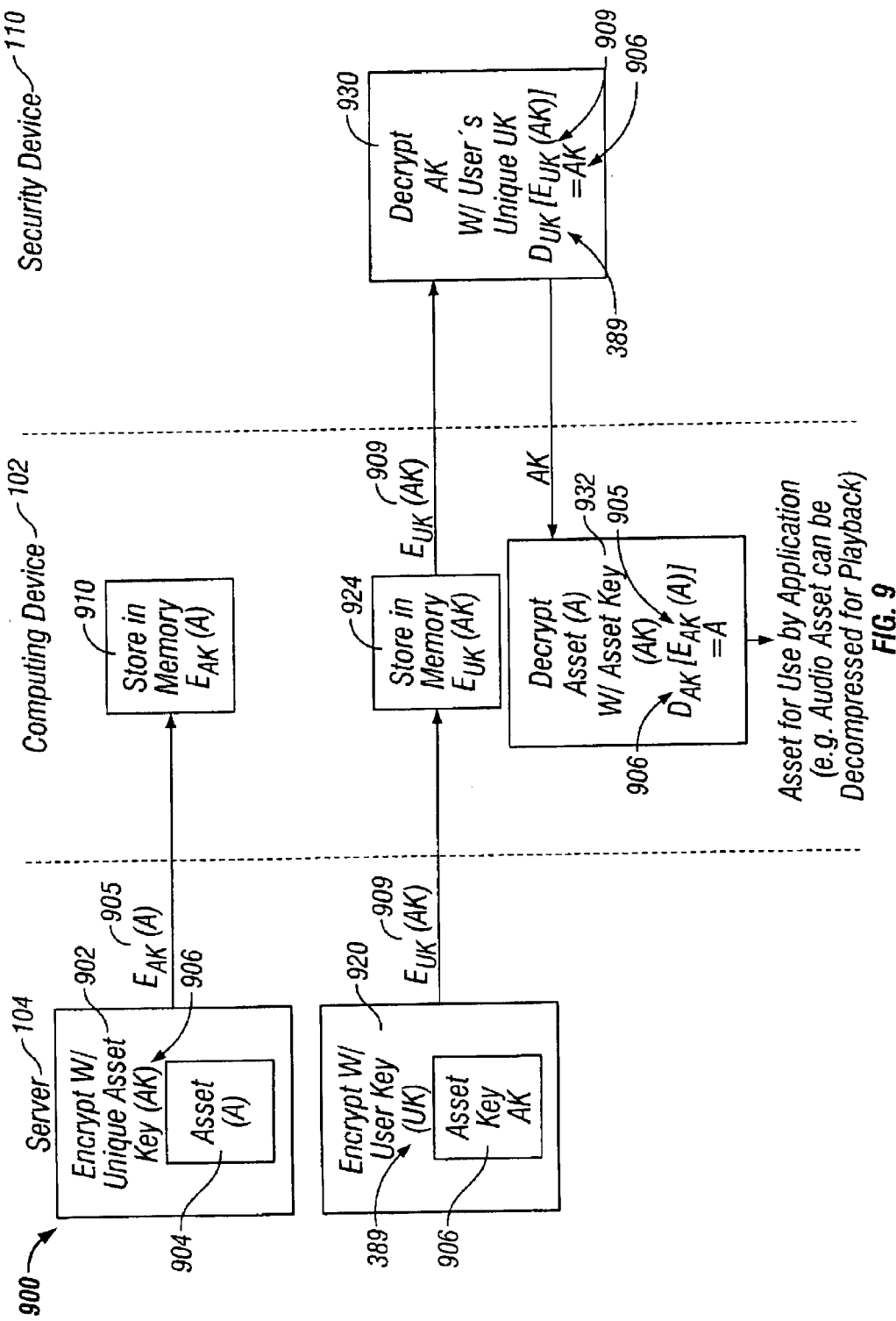
FIG. 9 illustrates an example of a secure asset delivery system, according to one embodiment of the present invention.

Referring now to FIG. 9, FIG. 9 illustrates an example of a secure asset delivery system 900, as previously described, according to one embodiment of the present invention. At block 902, an asset (A) 904 is encrypted with an asset key (AK) 906. The encrypted asset 905 (e.g. ($E_{AK}(A)$)) is then sent to the computing device 102 where it is stored in memory (e.g. asset storage 712) (block 910). Also, at block 920 the asset key (AK) 906 is encrypted with the user's user key (UK) 389. The encrypted asset key 909 (e.g. ($E_{UK}(AK)$)) is then sent to the computing device 102 where it is stored in memory (block 924). At block 930, the security device 110 decrypts the encrypted asset key 909 with the user's unique user key (UK) 389 (e.g. $D_{UK}[E_{UK}(AK)]$) to yield the asset key 906 (AK), which is then forwarded onto the computing device 102. Then, at block 932, the computing device 102 can decrypt the encrypted asset 905 with the asset key (AK) 906 (e.g. $D_{AK}[E_{AK}(A)]$) to yield the asset (A). The asset can then be utilized by the application software module 402 of the computing device 102. For example, if the asset is an audio file, the audio file can be decompressed for playback as part of a multimedia presentation of a Jamtrack to facilitate learning of guitar. It should be appreciated that encryption and decryption algorithms are well known in the art, and that various types of encryption and decryption algorithms can be used by the server 104, the computing device 102, and the security device 110.

The security software of the server 104, computing device 102, and the firmware of the security device 110, include standard encryption and decryption routines to encrypt and decrypt assets, keys, dates and other data sent between these devices. Any suitable block mode cipher that utilizes pseudo-random generators to XOR pseudo-random numbers with data can be used. Some examples include Data Encryption Standard (DES), International Date Encryption Algorithm (IDEA), etc.

A more detailed embodiment of the secure asset delivery system 900, according to one embodiment of the present invention, will now be discussed. As previously discussed, the server 104 encrypts each asset sent to a user with a unique asset key. Moreover, the server 104 also sends an indication as to whether the asset is to be rented or owned by the user. Assets that are rented expire when the user's subscription expires and cannot be used after the subscription. Assets that are owned by the user do not expire when the user's subscription expires. The server 104 further sends the unique asset key required to decrypt the asset to the user in an encrypted form—wherein the asset key is encrypted with the user key 389 of the security device 110 for the user such that the security device 110 can decrypt the encrypted asset key and the computing device 102 can then decrypt the asset with the decrypted asset key to provide the user access to the asset. Thus, an asset can be delivered securely to a specific user having a particular security device.

The computing device 102, operating with the application software module 402, the security software module 408 and in conjunction with the other software modules, performs many functions related to decrypting and accessing the asset, as has been previously discussed. The computing device 102 receives and stores the encrypted asset and the encrypted asset key in local memory (e.g. asset storage 712). The computing device 102 sends the encrypted asset key (and an indication of whether the asset is rented our owned) to the security device 110. The security device 110, under control of the firmware 383, decrypts the asset key and determines whether the asset has expired due to a lapsed subscription. If the asset has not expired, the security device 110 sends the decrypted asset key to the computing device 102 so that the asset can be decrypted by the computing device and can then be utilized. As previously discussed, the computing device 102 decrypts the asset with the asset key to yield the asset.

On the other hand, if the subscription has expired, the security device 110 notifies the computing device 102, and the computing device 102 notifies the user that the subscription has expired. Specific process steps will now be discussed to implement this functionality.

Figures 10A, 10B:
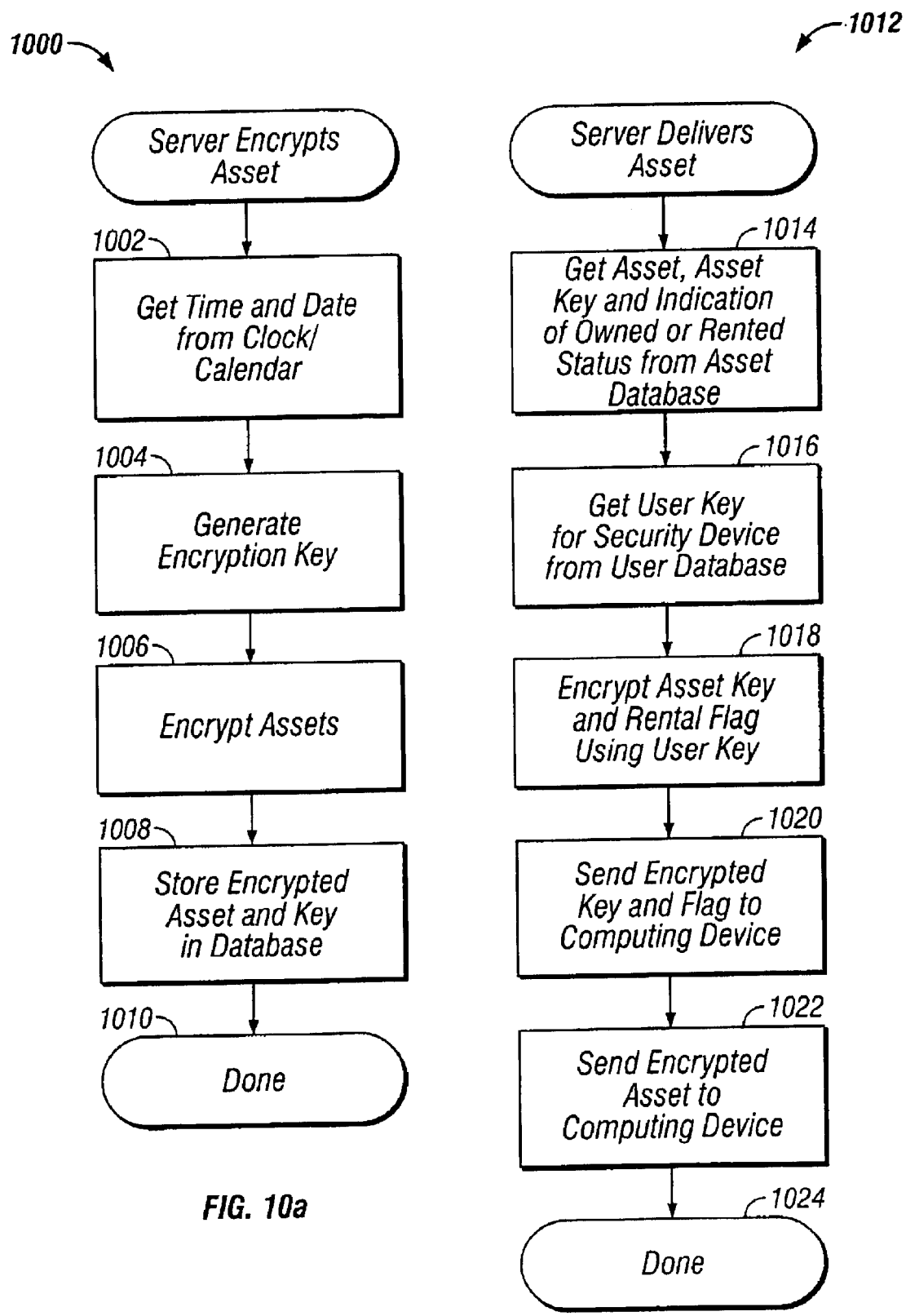
FIG. 10a is a flow diagram illustrating a process for the server to encrypt assets, according to one embodiment of the present invention.
FIG. 10b is a flow diagram illustrating a process for the server to deliver assets, according to one embodiment of the present invention.

Referring to FIG. 10*a*, FIG. 10*a* is a flow diagram illustrating a process 1000 for the server 104 to encrypt assets, according to one embodiment of the present invention. The server 104 operates under the control of the application software module 416, the security software module 422 and in conjunction with the other software modules, to implement the functions of the processes, as will be discussed. At block 1002, the server 104 obtains the time and date from the clock/calendar of the server 104. Next, the server 104 generates an encryption key (block 1004). The server 104 then encrypts the asset with a unique asset key (block 1006). The server 104 then stores the encrypted asset and the asset key in the asset database 107 (block 1008). The process 1000 is then complete (block 1010).

Referring now to FIG. 10*b*, FIG. 10*b* is a flow diagram illustrating a process 1012 for the server 104 to deliver the asset, according to one embodiment of the present invention. At block 1014, the server 104 obtains the asset, the asset key, and a status indication of whether the asset is owned or rented from the asset database 107. The status indication may be implemented as a rental flag—e.g. a rental flag that is set corresponds to the asset being rented by the user and a rental flag that is not set corresponds to the asset being owned or purchased by the user. Further, the server 104 obtains the user key 389 for the user (corresponding to the user's security device 110) from the user information database 109 (block 1016). Next, the server 104 encrypts the asset key and the rental flag utilizing the user's user key 389 (block 1018). The server 104 then sends the encrypted asset key and rental flag to the computing device 102 (block 1020). Further, the server 104 sends the encrypted asset to the computing device 102 (block 1022). The process 1012 is then complete (block 1024).

Figure 10C:
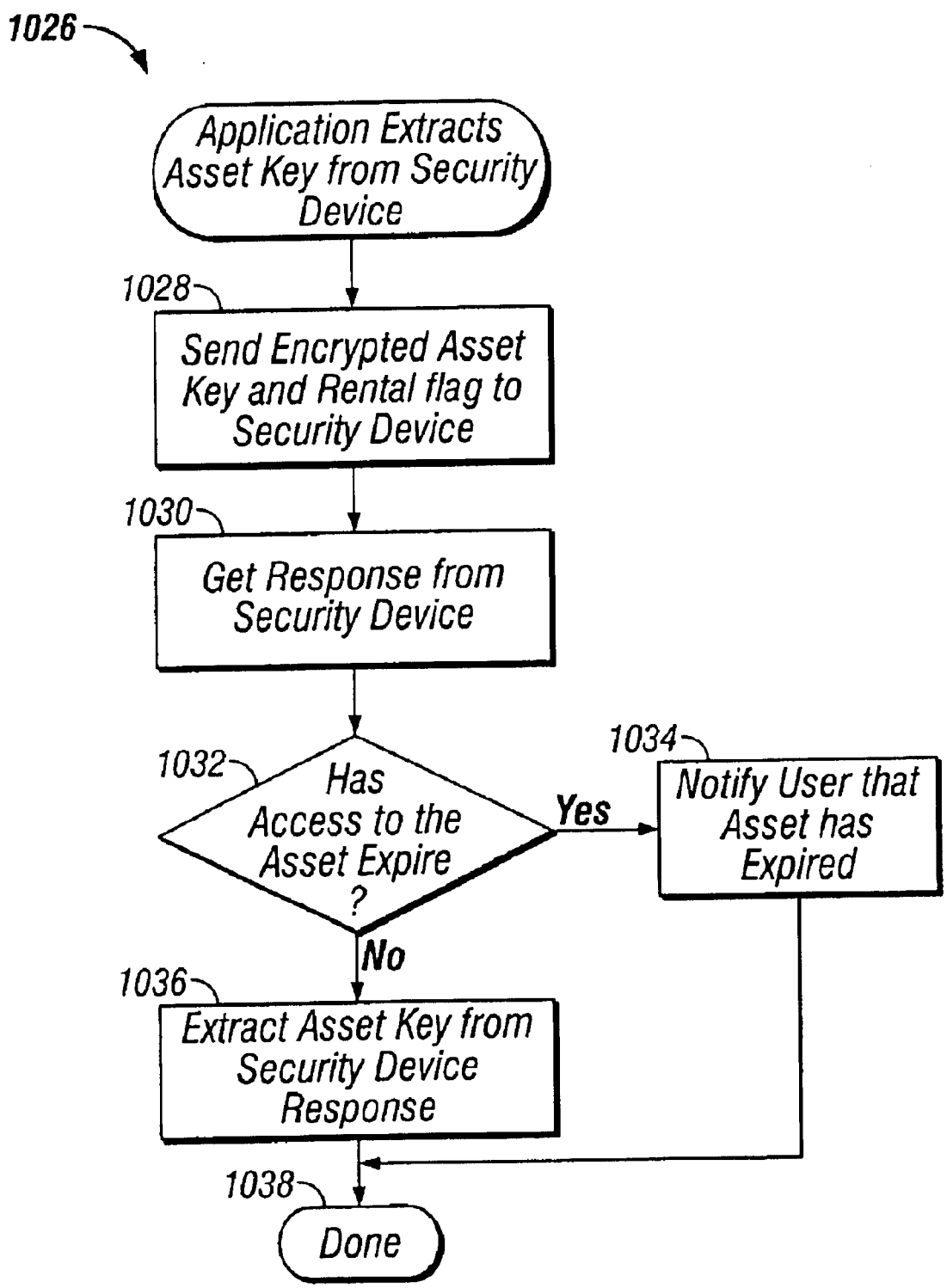
FIG. 10c is a flow diagram illustrating a process by which the computing device perform the functions of extracting an asset key from the security device, according to one embodiment of the present invention.

Turning now to FIG. 10*c*, FIG. 10*c* is a flow diagram illustrating a process 1026 by which the computing device 102 performs the functions of extracting the asset key from the security device 110, according to one embodiment of the present invention. The computing device 102 operates under the control of the application software module 402, the security software module 408 and in conjunction with the other software modules, to implement the functions of the processes, as will be discussed. At block 1028, the computing device 102 sends the encrypted asset key and rental flag received from the server 104 to the security device 110. Next, the computing device 102 obtains a response from the secure device 110 (block 1030). The response includes a notification as to whether the asset has expired, and if the asset has not expired, the decrypted asset key. The generation of the response at the security device 110 will be discussed later with reference to FIG. 10*e*.

At block 1032, the computing device 102 determines, based on the response from the security device 110, whether access to the asset has expired (block 1032). For example, if the asset is rented and the subscription has expired (i.e. the current date is passed the subscription expiration date for the asset), then access to the asset has expired. Thus, if access to the asset has expired, then at block 1034, the computing device 102 notifies the user that access to the asset has expired. If access to the asset has not expired (i.e. the asset is owned or the subscription expiration date has not passed), then the computing device extracts the asset key from the security device response (block 1036). The process 1026 is then complete (block 1038).

Figure 10D:
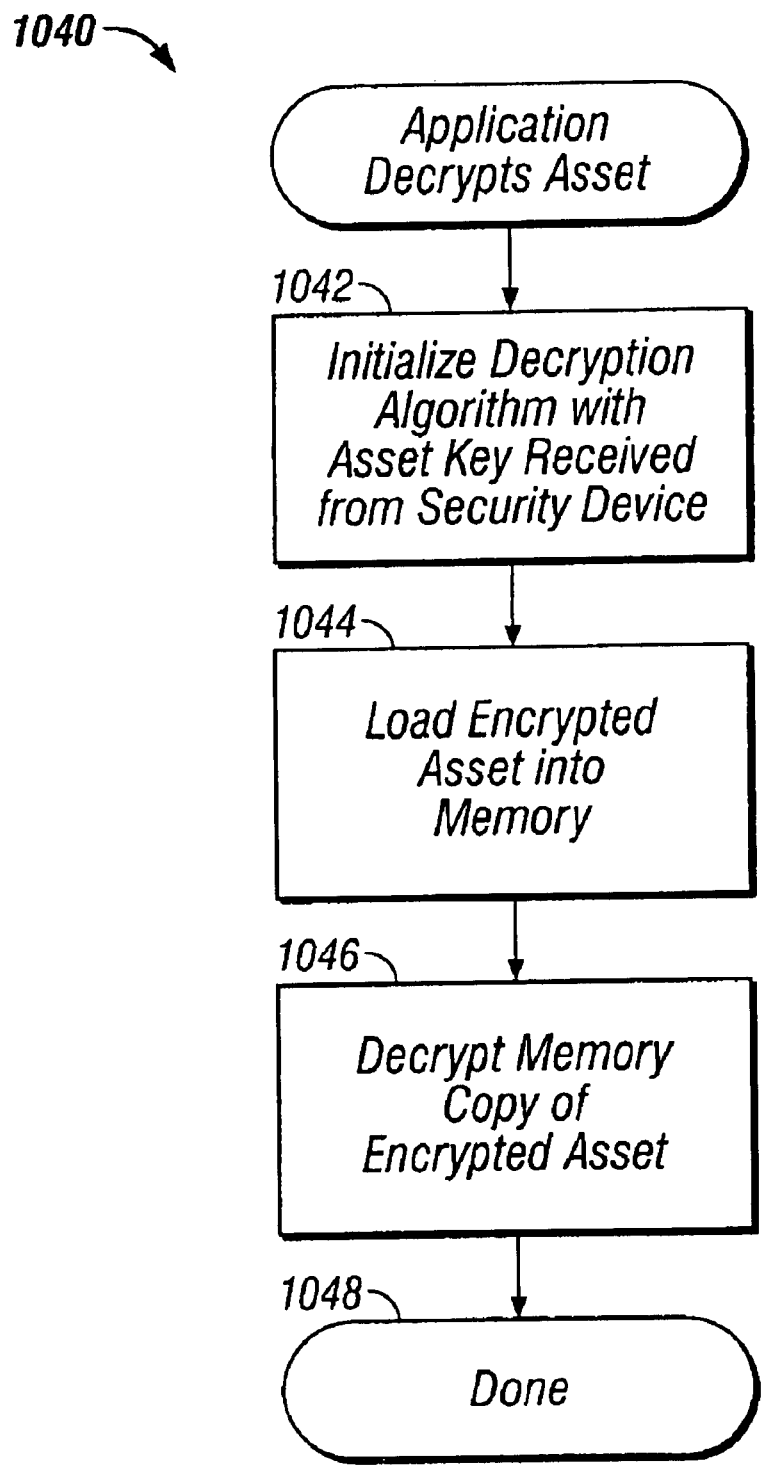
FIG. 10d is a flow diagram illustrating a process by which the computing device performs the functions of decrypting an asset, according to one embodiment of the present invention.

Referring now to FIG. 10*d*, FIG. 10*d* is a flow diagram illustrating a process 1040 by which the computing device 102 performs the functions of decrypting the asset, according to one embodiment of the present invention. At block 1042, the computing device 102 initializes a decryption algorithm with the asset key received from the security device 110. Next, the computing device 102 loads the encrypted asset into memory (block 1044). The computing device 102 then decrypts the memory copy of the encrypted asset utilizing the asset key received from the security device 110 to decrypt the encrypted asset (i.e. the encrypted asset being encrypted with the asset key) (block 1046). Thus, the asset is yielded to the computing device 102, for use by the computing device 102. The asset can then be utilized by applications of the computing device 102. For example, if the asset is an audio file, the audio file can be decompressed for playback as part of a multimedia presentation of a Jamtrack to facilitate the learning of guitar, as previously discussed.

Figure 10E:
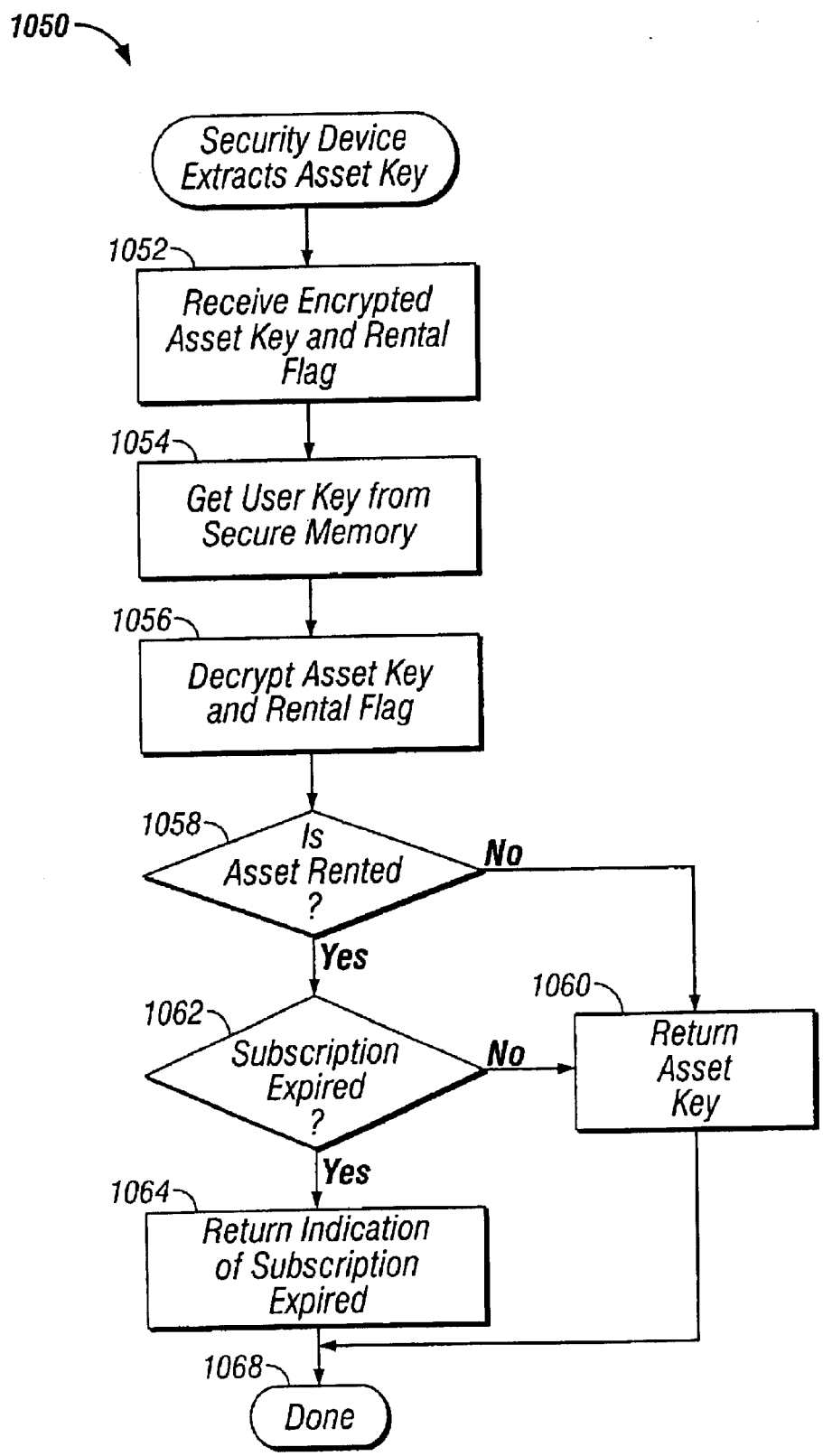
FIG. 10e is a flow diagram illustrating a process by which the security device extracts the asset key, according to one embodiment of the present invention.

Turning now to FIG. 10*e*, FIG. 10*e* is a flow diagram illustrating a process 1050 by which the security device 110 extracts the asset key, according to one embodiment of the present invention. As previously discussed, the security device 110 operates under the control of the firmware 383. At block 1052, the security device 110 receives the encrypted asset key and the rental flag from the computing device 102. The encrypted asset key and rental flag being encrypted with the user key. The security device 110 then obtains the user key 389 from nonvolatile memory 384 (block 1054). Next, the security device 110 decrypts the asset key and rental flag with the user key 389 (block 1056).

The security device then determines whether the asset is rented (block 1058). If not (i.e. it is owned), the security device 110 returns the decrypted asset key to the computing device 102 (block 1060) and process 1050 is complete (block 1068). However, if the asset is rented, the security device 110 next determines whether the subscription has expired (i.e. whether the current date is passed the subscription expiration date for the asset) (block 1062). If not, the security device 110 returns the decrypted asset key to the computing device 102 (block 1060) and the process 1050 is complete (block 1068). However, if the subscription has expired, then the security device 110 returns a response with an indication to the computing device 102 that the subscription has expired (block 1064). The process 1050 is then complete (block 1068).

It should be appreciated that the security software of the server 104, computing device 102, and the firmware of the security device 110, utilize standard encryption and decryption routines to encrypt and decrypt assets, keys, dates and other data sent between these devices, as has been discussed. Any suitable block mode cipher that utilizes pseudo-random generators to XOR pseudo-random numbers with data can be used. Some examples include Data Encryption Standard (DES), International Date Encryption Algorithm (IDEA), etc.

Accordingly, as previously described, the secure asset delivery system ensures that digital assets are encrypted and decrypted such that only a computing device coupled to properly authorized security device, that is associated with a particular user/subscriber, can receive and utilize the assets. Embodiments of the present invention provide a secure asset delivery system wherein digital assets are properly encrypted by the secure server 104 and can only be decrypted by a computing device 102 that is coupled to a properly authorized security device 110 such that only that properly authorized computing devices 102 can receive and utilize the assets—thereby protecting against unauthorized duplication of licensed material. As previously discussed, in one embodiment, the asset database 107 contains assets (e.g. multimedia presentations associated with musical pieces, audio files—such as Jamtracks including full songs and songs with various instrumental tracks removed)), as well as other digital assets. For example, in one embodiment, if the asset is an audio file, the audio file can be decompressed for playback as part of a multimedia presentation of a Jamtrack to facilitate the learning of guitar, as previously discussed. Further, it should be appreciated that the asset database 107 can include any other digital assets (e.g. multimedia, videos, movies, voice, sound recordings, software, other generic forms of data etc.) that can be purchased or rented and downloaded to a computing device 102 over a computer network 105.

The various aspects of the previously described inventions can be implemented as one or more instructions (e.g. software modules, programs, code segments, etc.) to perform the previously described functions. The instructions which when read and executed by a processor, cause the processor to perform the operations necessary to implement and/or use embodiments of the invention. Generally, the instructions are tangibly embodied in and/or readable from a machine-readable medium, device, or carrier, such as memory, data storage devices, and/or remote devices. The instructions may be loaded from memory, data storage devices, and/or remote devices into the memory of the computing device 102, server 104, and interface device 106 for use during operations. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While, embodiments of the present invention have been described with reference to the World-Wide Web, the methods, systems, and apparatuses described herein are equally applicable to other network infrastructures or other data communications systems.

While the present invention and its various functional components have been described in particular embodiments, it should be appreciated the embodiments of the present invention can be implemented in hardware, software, firmware, middleware or a combination thereof and utilized in systems, subsystems, components, or sub-components thereof. When implemented in software (e.g. as a software module), the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computing device to allow for the selection and display of a multimedia presentation of an audio file to a user and to allow the user to play a guitar in conjunction with the multimedia presentation, wherein an interface device couples the guitar to the computing device by performing analog to digital conversion of the guitar's analog audio signal to create a digitized audio signal and a server transmits a session file associated with a musical piece to the computing device through a computer network, the session file including an audio file and multimedia data, the computing device comprising:
 a communication device to:
  transmit a user's request for the selection of a musical piece to the server, and
  receive the session file associated with the selected musical piece from the server; and
 a processor to:
  process the session file such that the computing device presents a multimedia presentation of the audio file to the user;
  process the digitized audio signal of the guitar so that the user can play the musical instrument in conjunction with the multimedia presentation of the audio file and
  create and display a control panel graphical interface including an amplifier for the guitar, the control panel graphical interface having settings that define sound characteristics for the guitar.

2. The computing device of claim 1, further comprising displaying music notation associated with the audio file of the musical piece selected by the user in the multimedia presentation to the user.

3. The computing device of claim 1, wherein the server identifies the user based upon a unique identifier.

4. The computing device of claim 3, wherein the unique identifier is a serial number.

5. The computing device of claim 3, further comprising displaying a presentation of musical pieces tailored to the user based upon the unique identifier.

6. The computing device of claim 3, wherein the interface device stores a user key associated with the interface device.

7. The computing device of claim 6, wherein the audio file transmitted from the server to the computing device of the user is encrypted with an audio file key associated with the audio file and the audio file key is encrypted with a user key for the user and is also transmitted to the computing device.

8. The computing device of claim 7, wherein the interface device decrypts the audio file key that is encrypted with the user key using the stored user key and transmits the decrypted audio file key to the computing device, further comprising:

decrypting the audio file with the audio file key.

9. The computing device of claim 1, in response to the multimedia data of the session file, further comprising setting the control panel graphical interface to pre-defined values to model the sound characteristics of the guitar associated with the audio file for the musical piece selected by the user.

10. The computing device of claim 9, wherein a guitar track is removed from the audio file for the musical piece selected by the user such that the user can play the user's guitar in conjunction with a multimedia presentation of the audio file that does not include the guitar track.

11. The computing device of claim 10, further comprising displaying music notation for a guitar associated with the audio file of the musical piece selected by the user in the multimedia presentation to the user.

12. A computer-readable medium having stored thereon instructions executable by a computing devices, the computing device to allow for the selection and display of a multimedia presentation of an audio file to a user and to allow the user to play a guitar in conjunction with the multimedia presentation, wherein an interface device couples the guitar to the computing device by performing analog to digital conversion of the guitar's analog audio signal to create a digitized audio signal and a server transmits a session file associated with a musical piece to the computing device through a computer network, the session file including an audio file and multimedia data, the instructions when executed by the computing device, cause the computing device to perform the following operations comprising:

transmitting a user's request for the selection of a musical piece to the server;

receiving the session file associated with the selected musical piece from the server;

processing the session file such that the computing device presents a multimedia presentation of the audio file to the user;

processing the digitized audio signal of the guitar so that the user can play the musical instrument in conjunction with the multimedia presentation of the audio file; and creating and displaying a control panel graphical interface including an amplifier for the guitar, the control panel graphical interface having settings that define sound characteristic for the guitar.

13. The computer-readable medium of claim 12, further comprising displaying music notation associated with the audio file of the musical piece selected by the user in the multimedia presentation to the user.

14. The computer-readable medium of claim 12, wherein the server identifies the user based upon a unique identifier.

15. The computer-readable medium of claim 14, wherein the unique identifier is a serial number.

16. The computer-readable medium of claim 14, further comprising displaying a presentation of musical pieces tailored to the user based upon the unique identifier.

17. The computer-readable medium of claim 14, wherein the interface device stores a user key associated with the interface device.

18. The computer-readable medium of claim 17, wherein the audio file transmitted from the server to the computing device of the user is encrypted with an audio file key associated with the audio file and the audio file key is encrypted with a user key for the user and is also transmitted to the computing device.

19. The computer-readable medium of claim 18, wherein the interface device decrypts the audio file key that is encrypted with the user key using the stored user key and transmits the decrypted audio file key to the computing device, further comprising:

decrypting the audio file with the audio file key.

20. The computer-readable medium of claim 12, in response to the multimedia data of the session file, further comprising setting the control panel graphical interface to pre-defined values to model the sound characteristics of the guitar associated with the audio file for the musical piece selected by the user.

21. The computer-readable medium of claim 20, wherein a guitar track is removed from the audio file for the musical piece selected by the user such that the user can play the user's guitar in conjunction with a multimedia presentation of the audio file that does not include the guitar track.

22. The computer-readable medium of claim 21, further comprising displaying music notation for a guitar associated with the audio file of the musical piece selected by the user in the multimedia presentation to the user.

23. A method to allow for the selection and display of a multimedia presentation of an audio file to a user and to allow the user to play a guitar in conjunction with the multimedia presentation, wherein an interface device couples the guitar to a computing device by performing analog to digital conversion of the guitar's analog audio signal to create a digitized audio signal and a server transmits a session file associated with a musical piece to the computing device through a computer network, the session file including an audio file and multimedia data, the method comprising:

transmitting a user's request for the selection of a musical piece to the server;

receiving the session file associated with the selected musical piece from the server;

processing the session file such that the computing device presents a multimedia presentation of the audio file to the user;

processing the digitized audio signal of the guitar so that the user can play the guitar in conjunction with the multimedia presentation of the audio file; and creating and displaying a control panel graphical interface including an amplifier for the guitar, the control panel graphical interface having settings that define sound characteristics for the guitar.

24. The method of claim 23, further comprising displaying music notation associated with the audio file of the musical piece selected by the user in the multimedia presentation to the user.

25. The method of claim 23, wherein the server identifies the user based upon a unique identifier.

26. The method of claim 25, wherein the unique identifier is a serial number.

27. The method of claim 25, further comprising displaying a presentation of musical pieces tailored to the user based upon the unique identifier.

28. The method of claim 25, wherein the interface device stores a user key associated with the interface device.

29. The method of claim 28, wherein the audio file transmitted from the server to the computing device of the user is encrypted with an audio file key associated with the audio file and the audio file key is encrypted with a user key for the user and is also transmitted to the computing device.

30. The method of claim 29, wherein the interface device decrypts the audio file key that is encrypted with the user key using the stored user key and transmits the decrypted audio file key to the computing device, further comprising:

decrypting the audio file with the audio file key.

31. The method of claim 23, in response to the multimedia data of the session file, further comprising setting the control panel graphical interface to pre-defined values to model the sound characteristics of the guitar associated with the audio file for the musical piece selected by the user.

32. The method of claim 31, wherein a guitar track is removed from the audio file for the musical piece selected by the user such that the user can play the user's guitar in conjunction with a multimedia presentation of the audio file that does not include the guitar track.

33. The method of claim 32, further comprising displaying music notation for a guitar associated with the audio file of the musical piece selected by the user in the multimedia presentation to the user.

* * * * *